United States Patent [19]

Fujikake et al.

[11] 4,128,363
[45] Dec. 5, 1978

[54] AXIAL FLOW FAN

[75] Inventors: Kenji Fujikake; Haruo Katagiri; Katsuhito Yamada, all of Nagoya, Japan

[73] Assignee: Kabushiki Kaisha Toyota Chuo Kenkyusho, Aichi, Japan

[21] Appl. No.: 681,775

[22] Filed: Apr. 30, 1976

[30] Foreign Application Priority Data

| Apr. 30, 1975 | [JP] | Japan | 50-58988[U] |
| Apr. 30, 1975 | [JP] | Japan | 50-58989[U] |
| Apr. 30, 1975 | [JP] | Japan | 50-58990[U] |
| Nov. 7, 1975 | [JP] | Japan | 50-152509[U] |
| Feb. 27, 1976 | [JP] | Japan | 51-23737[U] |

[51] Int. Cl.² .......................... F04D 29/38
[52] U.S. Cl. ...................... 416/236 A; 416/175
[58] Field of Search ............ 416/236, 236 A, 175, 416/203

[56] References Cited

U.S. PATENT DOCUMENTS

| 571,500 | 11/1896 | West | 416/236 A |
| 675,477 | 6/1901 | Hall | 416/236 A |
| 1,022,203 | 4/1912 | Nettle | 416/236 A |
| 1,041,913 | 10/1912 | Tyson | 416/236 A |
| 1,066,988 | 7/1913 | Boutwell | 416/236 A |
| 1,244,786 | 10/1917 | Seymour | 416/236 A |
| 1,834,888 | 12/1931 | Baughn | 416/236 A |
| 2,104,306 | 1/1938 | McLeod | 416/236 A |
| 2,274,033 | 2/1942 | Booth | 416/203 X |
| 2,361,676 | 10/1944 | Baker | 416/236 A |
| 2,896,595 | 7/1959 | Guillo-Quevedo | 416/203 X |
| 3,193,185 | 7/1965 | Erwin et al. | 416/236 A X |
| 3,794,443 | 2/1974 | McCarty | 416/175 |

FOREIGN PATENT DOCUMENTS

| 1069279 | 7/1954 | France | 416/175 |
| 258376 | 9/1931 | Italy | 416/236 A |

Primary Examiner—Everette A. Powell, Jr.
Attorney, Agent, or Firm—Oblon, Fisher, Spivak, McClelland & Maier

[57] ABSTRACT

An axial flow fan includes a plurality of auxiliary blades disposed upon and projecting from the suction and/or pressure surfaces of primary fan blades radially disposed on a hub member. The auxiliary blades extend substantially in the width direction or transversely of the primary blades, and the leading edges of the auxiliary blades, as viewed in the rotational axis direction of the fan, are disposed closer to the rotational center of the hub member than the trailing edges of the auxiliary blades. In this manner, the axial flow fan produces an axial fluid flow by means of the primary blades and a radial fluid flow by means of the auxiliary blades.

18 Claims, 89 Drawing Figures

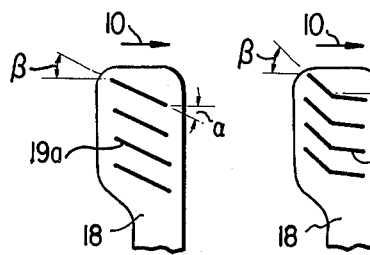 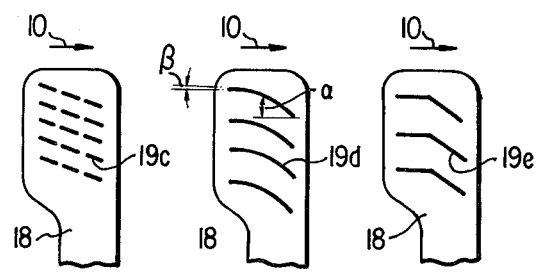
FIG.12A  FIG.12B  FIG.12C  FIG.12D  FIG.12E
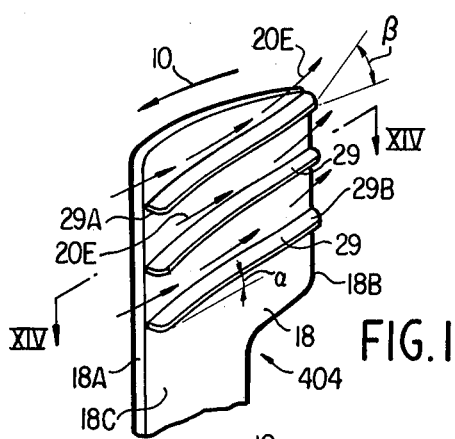
FIG.13
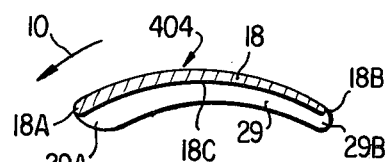
FIG.14
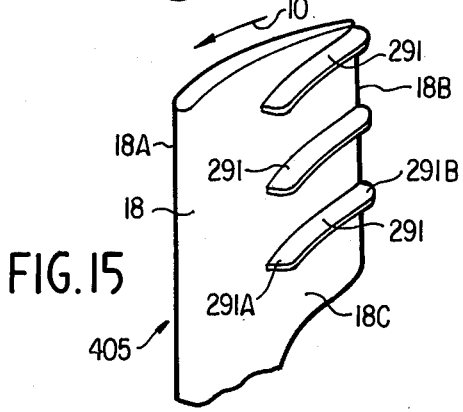
FIG.15
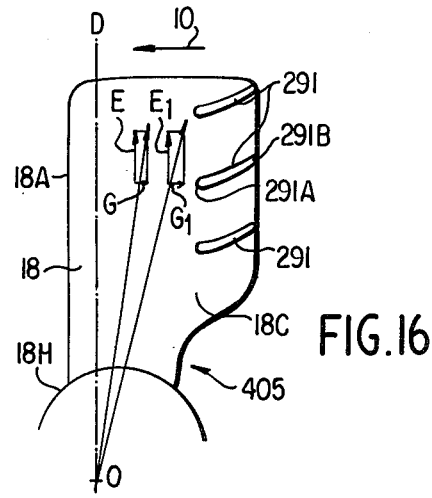
FIG.16
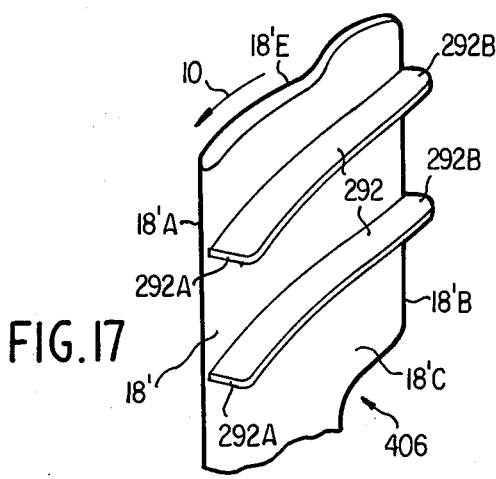
FIG.17
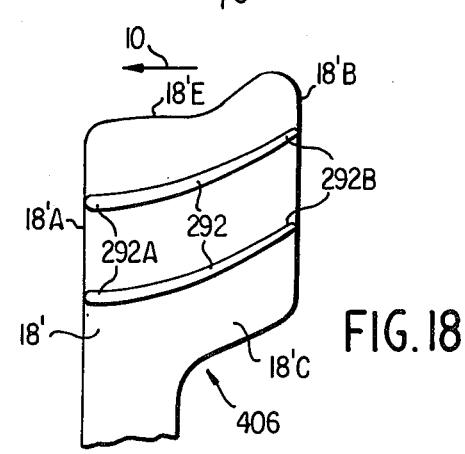
FIG.18

AXIAL FLOW FAN

BACKGROUND OF THE INVENTION

1. Field of the Invention

The present invention relates generally to axial flow fans, and more particularly to improvements in an engine cooling fan, an air ventilating fan, an air conditioning fan, and other axial flow fans.

2. Description of the Prior Art

Recently, there has arisen a demand for increasing the airflow or the flow rate of a fluid being impelled by a fan, such as, for example, for use in an engine cooling system of a motor vehicle, due to increases in heat generation and heat capacity as a result of the provision of additional equipment, such as, for example, exhaust-gas processing equipment, a cooler, power steering, and the like, and due to an increase in engine power required. At the same time, a demand for reducing the noise attributed to the fan has also been made.

Still further, a cooling fan used in air conditioning equipment is subjected to strict requirements due to an increase in the capability required per unit volume of the equipment, and consequently, a demand for reducing the weight and size of the equipment has also arisen.

A typical prior art axial flow fan will now be described herein by reference to a fan normally used in an engine cooling system of a motor vehicle in conjunction with the accompanying drawing FIGS. 1-3.

A cooling fan 4 provided on the side of an engine 3 in an engine compartment 2 of a motor vehicle 1, only part of which is shown, is coupled by means of a belt-pulley system 5 to the output shaft 6 of the engine 3.

From the front end of the motor vehicle toward the cooling fan 4, yet in front of the cooling fan 4 as viewed in the direction of travel of the motor vehicle, there is also provided a radiator grill 7, a condenser 8, and a radiator 9, in that order, respectively.

In general, the aforenoted cooling fan 4 is of the suction type and hence rotates in a direction so as to produce suction, whereby, due to the rotation of the cooling fan 4 in the direction of the arrow 10, there is produced air streams 11A and 11B on the blades of the fan, whereby there is also produced cooling air streams 12 passing through the aforenoted grill 7, condenser 8, and radiator 9.

Secured integrally to the radiator 9 is a shroud 13 having a slightly larger inner diameter than the locus of the maximum diameter of the fan blades 18 of fan 4, shroud 13 thereby covering the cooling fan 4. This is provided because all of the air streams which have been introduced under suction conditions by means of the fan 4 are desired to pass through radiator 9, with an accompanying increase in the capacity of the fan which blows the air. In this respect, there is provided a clearance S between the maximum diameter of the fan blades 18 and the inner periphery of the shroud 13. This clearance prevents contact between the fan 4 and the shroud 13 due to their relative vibrations, because the fan 4 is attached to the side of the engine 3, and hence vibrates together with the engine, while the shroud 13 is rigidly fixed on the side of the radiator 9. The clearance is generally set to be about 20 mm.

On the other hand, there is also provided clearances of about 20–30 mm between the fan 4 and a portion adjacent to the fan, such as, for example, between the fan 4 and the engine 3, radiator 9, or the like, because the fan may possibly contact these portions due to an axial movement of the fan which may be caused by a sudden stop or start of the motor vehicle, or due to a deformation of the fan, for which heat, stress, and the like, may be responsible.

When a motor vehicle is running, the vehicle receives ram air 14 from the front thereof, as shown in FIG. 3, so that the cooling action may be achieved due to the aforenoted ram air streams 14 as well as due to the cooling air streams 12 produced by the rotation of the fan 4.

The larger the clearance S between the fan 4 and the shroud 13, the better will be the efficiency of the ram air streams 14. However, if the clearance S is relatively large, and in case the ram air steams 14 are not prominent, as in the case of idling and low speed running of the motor vehicle, then there results a pressure difference between the suction side and the discharge side of the fan 4, with the result that there is provided a reverse flow of air from the discharge side of the fan, through the clearance S, to the suction side thereof, thus lowering the ventilating efficiency of the fan 4 to a great extent, as compared with the case where the clearance S is relatively small. This in turn lowers the blowing capability of the fan 4, and for these reasons, it is not recommended to provide a large clearance S.

The dimensions of the engine compartment have been minimized due to limitations from the viewpoint of design and style of the vehicle, as well as due to the requirements for compactness and decreased weight, and because of the installation of exhaust-gas processing equipment, accessories, and the like. For this reason, the efficiency of the cooling system having the aforenoted construction and function has been impaired, and yet, due to limitations either in the radial direction or in the axial direction, it has been difficult to increase the size of the cooling fan, despite a demand for an increase in the cooling capability thereof.

Generally, an increase in the airflow of an axial flow fan may be achieved by (i) an increase in the RPMs of the fan, (ii) improvements in the dimensions thereof, such as, for example, increases in the diameter of the fan, the blade angle, the number of blades, and the width of the blades, and (iii) a change in the configuration of the blades.

An increase in the rpm of the fan, however, necessarily leads to an increase in the horsepower required to drive the fan, as well as in an increase in the noise level produced, while improvements in the dimensions of the fan, and the blade configuration thereof results in an increase in the volume of equipment and in the level of noise. In addition, such increases cannot necessarily be attended with a proportional increase in airflow. On the other hand, one solution to this problem may be to reduce the clearance between the fan and the shroud, however, this suffers from various shortcomings, such as, for example, the danger of contact therebetween, as has been described hereinabove, and a decrease in the effect of the ram air streams.

Accordingly, it has long been desired to provide an axial flow fan which facilitates an increase in the airflow without accompanying changes in the dimensions and rpm of the fan and an increase in noise, or which may in fact reduce the noise level under a constant airflow, yet present a high level of efficiency in such an instance where there prevails a large blowing resistance. Such a desired axial flow fan, therefore, will be one in which the air streams created by the prior art fan will be utilized most effectively.

For a better understanding of the air streams created by the prior art axial flow fan, a more detailed description will now be given hereinbelow, by again referring to the engine cooling system.

A very large blowing resistance prevails on the suction side of the cooling fan 4, because of the decrease in the area of the opening of the radiator grill 7 which is required from a design consideration, the provisions of the condenser 8 due to the provision of a cooler, a decrease in the fin pitch for improving the radiating characteristics of the radiator 9, and an increase in the louver angle. A large blowing resistance also prevails on the discharge side of the fan 4, because of the engine block 3, exhaust gas processing equipment, a power steering pump, a cooler-compressor, and the like.

In case the fan is rotated in such a position wherein the large blowing resistance prevails on both the suction and discharge sides of the fan, air which is flowing in the axial direction on the suction side of the fan flows out in the inclined radial direction on the discharge side of the fan, as shown by the arrow 15 in FIG. 1, and this tendency becomes substantial as the blowing resistance increases on one or both of the suction and discharge sides of the fan.

This is attributed to the fact that, on the suction side of the fan where a large blowing resistance prevails, there is created a negative pressure or vacuum in a chamber 16 encompassed by fan 4, radiator 9 and shroud 13, while there prevails a slightly, positive pressure in a chamber 17 defined between the fan 4 and the engine 3 on the discharge side of the fan, due to the pressure build-up caused by the rotation of the fan and by the blowing resistance, whereby air streams will be slightly deflected toward the side of the lower pressure, and, as a result, will flow in the inclined radial direction as mentioned above.

On the other hand, air streams flowing along the surface of one of the blades 18, that is, air streams 11A flowing in the direction opposite to the direction 10 of the rotating blade and at the leading edge 18A thereof, also tend to be deflected in an inclined radial direction within the vicinity of the trailing edge 18B of the blade, thereby creating air streams 11B, as shown in FIG. 2, so that there occurs separation of the air streams from the blade surface, or in other words, turbulent air streams therealong. This incurs an increase in the aerodynamic loss of the fan and a lowering of its efficiency which in turn brings about a lowering of the generated airflow.

SUMMARY OF THE INVENTION

Accordingly, it is an object of the present invention to obviate the aforenoted shortcomings experienced with the prior art axial flow fans.

Another object of the present invention is to provide an axial flow fan which produces both an axial flow and a radial flow.

Still another object of the present invention is to provide an axial flow fan having auxiliary blades disposed upon and projecting from the surfaces of the primary fan blades.

Yet another object of the present invention is to provide an axial flow fan in which the airflow is greatly increased by producing a radial flow, in addition to an axial flow, on the suction surfaces and/or pressure surfaces of the blades.

A further object of the present invention is to provide an axial flow fan in which the fan noise and aerodynamic loss are greatly reduced, and the efficiency of the fan is increased, by preventing separation and turbulence of the air streams on the blades due to the radial flow along the auxiliary blades The foregoing and other objects are achieved in accordance with the present invention through the provision of an axial flow fan which includes a plurality of auxiliary blades disposed upon and projecting from the suction and/or pressure surfaces of primary fan blades radially disposed on a hub member. The auxiliary blades extend substantially in the width direction or transversely of the primary blades, and the leading edges of the auxiliary blades, as viewed in the rotating direction of the fan, are disposed closer to the rotational center of the hub member than the trailing edges of the auxiliary blades. In this manner, the axial flow fan produces an axial fluid flow by means of the primary blades and a radial fluid flow by means of the auxiliary blades.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIGS. 12(A)–12(E) are schematic views illustrating modifications of the auxiliary blades in the first to third embodiments of the present invention;

FIG. 13 is a perspective view of the fourth embodiment of the present invention;

FIG. 14 is a cross sectional view taken along the line XIV—XIV of FIG. 13;

FIGS. 15 and 16 are perspective and front views, respectively illustrating the fifth embodiment of the present invention;

FIGS. 17 and 18 are perspective and front views, respectively, of the sixth embodiment of the present invention;

DETAILED DESCRIPTION OF THE ILLUSTRATED EMBODIMENTS

Figure 48:
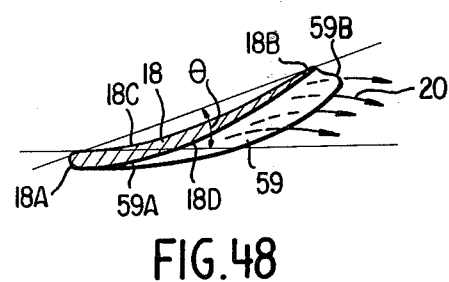
FIG. 48 is a cross-sectional view of the blade of FIG. 46.

In each of the embodiments to be described hereinbelow, an axial flow fan has a hub member 18H rotatably supported and driven by means of a drive source, and a plurality of blades having a predetermined angle with respect to the rotating direction thereof and a predetermined width and height, the blades being radially provided on the hub member. Furthermore, there is provided a pitch angle H, as seen in FIG. 48, ranging from about 10°–45°, the pitch angle H being defined as the angle formed by a line connecting the leading edge portion 18A to the trailing edge portion 18B of the fan blade, and by the rotational direction 10 of the fan.

Figure 4:
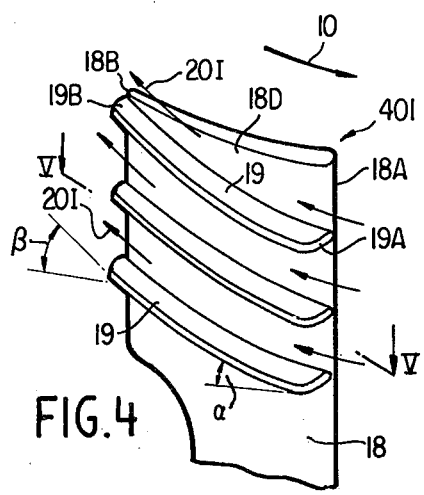
FIG. 4 is a perspective view of one of the blades of an axial flow fan constructed according to the first embodiment of the present invention.
Figure 5:
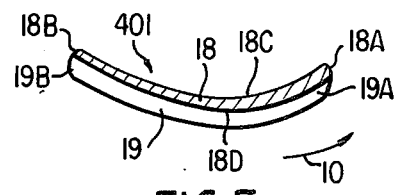
FIG. 5 is a cross sectional view taken along the line V—V of FIG. 4.

The first to the third embodiments constructed according to the first aspect of the present invention are shown in FIGS. 4–9. FIGS. 4 and 5 are a perspective view, and a cross-sectional view, respectively, of the essential part of the axial flow fan according to the first embodiment of the present invention, and as shown, there is provided three auxiliary blades or vanes 19 which are disposed upon and project outwardly from a suction surface 18D of a fan, generally indicated by the reference character 401, the entire view of the fan 401 being omitted.

Figure 2:
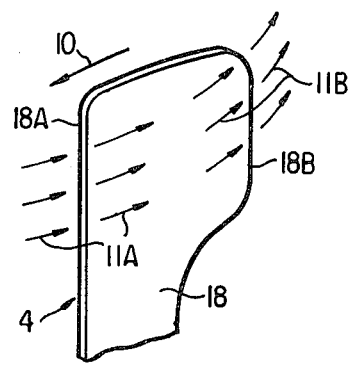
FIG. 2 is a perspective view showing a blade of an axial flow fan of the prior art, and the air streams flowing along a surface of the blade.
Figure 3:
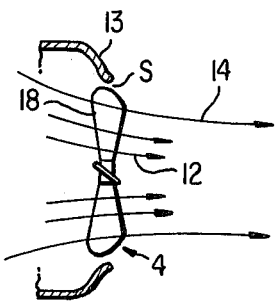
FIG. 3 is an enlarged, partial view, showing the stream lines of the air flow created by the prior art fan in the engine cooling system of the motor vehicle of FIG. 1.

These auxiliary blades or vanes 19 have a predetermined width, length and thickness, and extend a substantial distance substantially parallel to the air streams 11A and 11 B, as seen in FIG. 2, flowing along the surface of the fan blade 18 when the fan is rotated in the direction of arrow 10. More particularly, the vanes are disposed in the axial direction of the fan 401 from the leading edge portion 18A toward the trailing edge portion 18B of the blade 18, and extend substantially concavely along the suction, that is, the convex, surface 18D of the fan blade 18, so as to be curved upwardly as one proceeds in direction from the leading edge 18A toward the trailing edge 18B of the blade 18. In addition, the vanes 19 are serially disposed, with a predetermined spacing therebetween, in the radial direction of the fan.

In this case, an inlet angle $\alpha$ of each of the vanes 19, that is, the inclination of a vane 19 with respect to the direction of rotation of the fan, in the vicinity of the leading edge 19A of the vane 19, as viewed in the direction of the rotating fan, ranges from about 0°–15°, while an outlet angle $\beta$ of the vane 19, that is, the inclination of a vane 19 with respect to the direction of rotation of the fan, in the vicinity of the trailing edge 19B of the vane, as viewed in the direction of the rotating fan, falls in the range of about 15°–60°.

Accordingly, when the fan 401 is rotated in the direction of arrow 10, there is created air streams 201 which flow along the suction surface 18D of the blade 18, and are guided by means of the vanes 19.

Conventionally, the suction surface, or negative pressure side, of a fan blade of an axial flow fan does not contribute to the blowing action of the fan. However, according to this embodiment, there is created air streams along the vanes 19 on the suction surface 18D of the blade, and due to the air streams thus created, separation or turbulence of the air is not caused or is caused only in the vicinity of the trailing edge 18B of the blade, whereby a majority of the suction surface of the blade 18D can in fact contribute to the blowing action of the fan. As a result, not only the efficiency of the fan is enhanced, but also the airflow is greatly increased due to such contribution of the suction surface 18D of the blade which heretofore has failed to effect such a blowing action. Furthermore, the fan noise, which is mostly attributed to separation and turbulence of the airstream, is greatly reduced.

Still further, as the outlet angle $\beta$ of the vane 19 is larger than the inlet angle $\alpha$ thereof, the vane 19 achieves the function of a blade, thus strongly impelling air streams 20I outwardly in the inclined radial direction of the blade. As a result, a centrifugal effect is added to the blowing effect of the axial flow fan, and consequently, air streams thus impelled will effectively flow in the direction away from obstacles on the discharge side of the fan, such as, for example, engine 3, and the like, while parts of the air streams impinge upon the inner peripheral surface of the shroud 13 and then flow toward the discharge side of the fan 401. This prevents a reverse flow of the air streams, that is, from the discharge side, towards the suction side, of the fan 401 and through the clearance S between the fan 401 and the shroud 13.

Since the vanes 19 are formed along the stream line of the air streams which would be created in a conventional blade, and since the reverse flow of the air streams can be prevented without reducing the clearance S, the flow of ram air, when a motor vehicle is travelling, will not be impeded. Therefore, the cooling performance will not be impaired even at high speed running of the vehicle, and these same results are achieved with all of the following embodiments when applied to an engine cooling system of a motor vehicle.

Figure 6:
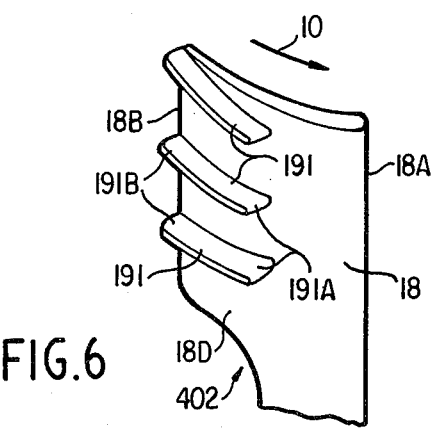
FIGS. 6 and 7 are perspective and front views, respectively, illustrating the second embodiment of the present invention.
Figure 7:
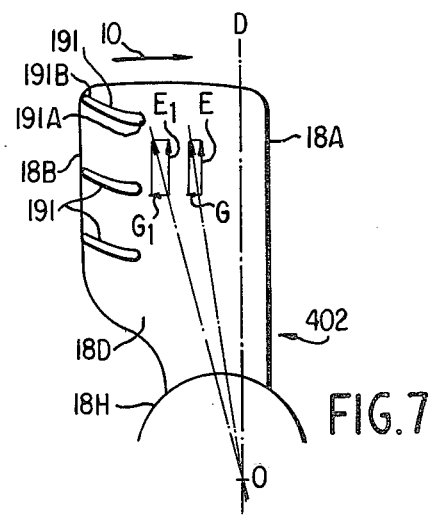

FIGS. 6 and 7 illustrate the second embodiment of the present invention, and according to the second embodiment of the invention, the length of the auxiliary blades or vanes 191 is shortened as compared with the length of the auxiliary blades or vanes 19 in the first embodiment, such that the three vanes 191 are disposed on the suction surface 18D of the blade 18 only within the trailing edge portion 18B thereof.

In this case, since the trailing edge portion 18B of the suction surface 18D of the blade 18 greatly contributes to the blowing action of the fan and separation and turbulence of the air streams occurs within the trailing edge portion of the blade surface, there may be achieved the desired blowing action and reduction in the fan noise, even if the vanes 191 are solely provided within the trailing edge portion 18B of the blade 18.

It is to be noted that the center of gravity G of the blade 18 is shifted to a point G1 on the trailing edge portion 18B of the blade 18, as shown in FIG. 7, and consequently, the centrifugal force E will be increased to $E_1$ due to the rotation of the fan 402, with the result that an increase in the moment of the blade 18 will occur, which, in turn, increases the deflection of the blade 18 from an axis OD of the blade, O representing the center of rotation of the fan. The increase in the deflection of the blade 18 decreases the horsepower required to drive the fan, and the airflow of the vanes 191 is increased.

Figure 8:
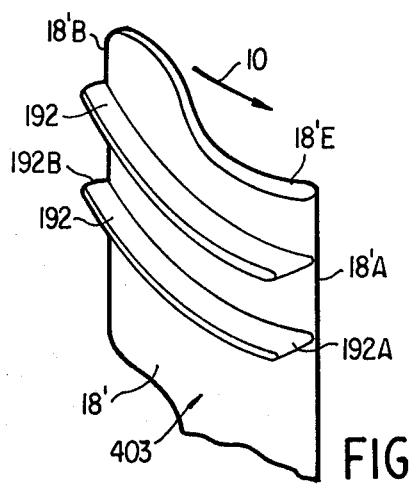
FIGS. 8 and 9 are perspective and front views, respectively, of the third embodiment of the present invention.
Figure 9:
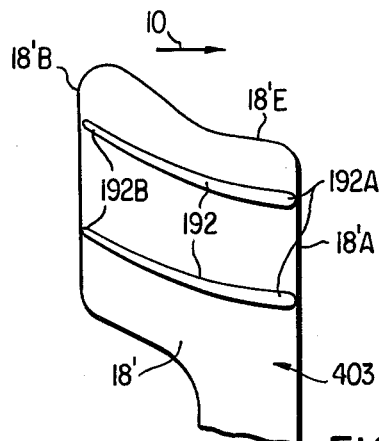

The blade 18 as shown in the first and second embodiments has a tip portion, at the outermost radial position, which is of an arcuate configuration having its center on the axis of rotation of the fan. Alternatively, according to the third embodiment of the present invention, in which two auxiliary blades 192 are provided, as shown in FIGS. 8 and 9, the blade 18 of the fan 403 may have a tip portion 18'E including a small, radially outwardly projecting arcuate portion on the trailing edge part 18'B thereof so that the vane 192 does not extend to the tip portion.

In this embodiment, since the tip edge portion of the balde in the trailing edge portion 18'B thereof is projected outwardly toward the inner periphery of the shroud, if any, and since the vane is extended toward and within such projected portion, the radial flow is produced at a point having a higher peripheral speed on the blade and vane, and thus, a stronger radial flow may be produced. Furthermore, advantageous effects are achieved, such as, for example, an increase in the diameter of the fan, and an increase in the acting or working area of the vane 192, as well as a saving in the number of vanes to be provided at the root portion of a blade that effects less blowing action, and consequently, the efficiency of the fan may be enhanced.

In the first to third embodiments, the provision of the auxiliary blades or vanes 19, 191 or 192, with small spacings therebetween, on the tip portion of the blade, rather than on the root portion thereof, will present better efficiency of the fan.

TEST RESULTS

An improved axial flow fan constructed according to the first embodiment of the present invetion, which is applied to an engine cooling system, was compared with that which is free of the auxiliary blades or vanes under the same conditions, that is, the same outer diameter and the same number of fan blades.

The fan according to the present invention had the following characteristics:

1. The outer diameter of fan and the number of blades 360$\phi$-6

2. Auxiliary blades or vanes (provided on the suction surface of the blade):

(a) number of vanes and spacing of vanes 3 vanes/fan blade, 30 mm apart (b) inlet angle $\alpha$ 5°

(c) outlet angle $\beta$ 34°

(d) width (height) 10 mm

Figure 10:
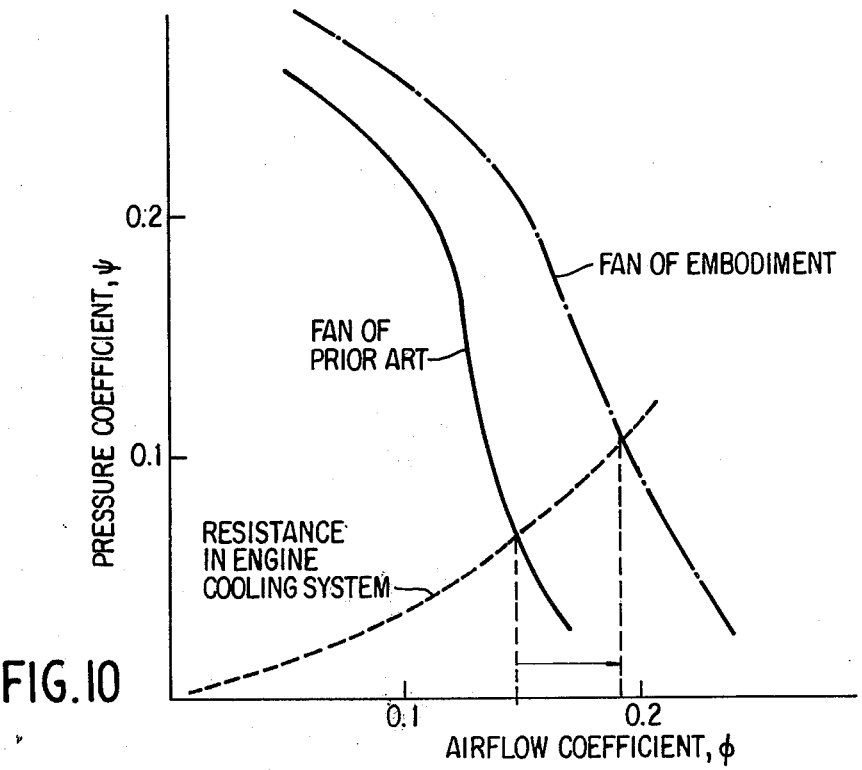
FIGS. 10 and 11 show characteristic curves illustrating the comparison in performance of the axial flow fan constructed according to the first embodiment of the present invention, which is applied to an engine cooling system, with that of the axial flow fan constructed according to the prior art.
Figure 11:
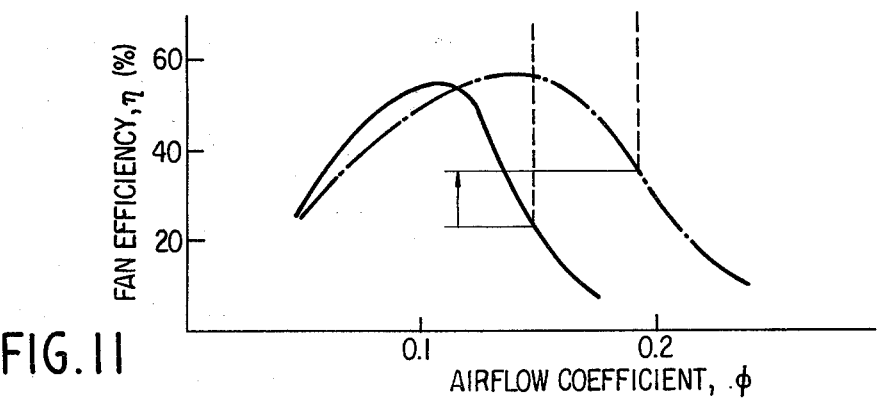

FIGS. 10 and 11 show the characteristic curves of both fans. In FIG. 10, the ordinate shows the pressure coefficient $\psi$ and the abscissa shows the airflow coefficient $\phi$, while in FIG. 11, the ordinate shows the fan efficiency $\eta$ and the abscissa shows the airflow coefficient $\phi$. The comparison of the fan according to the present invention with the prior art fan reveals the fact that according to the present invention, the airflow is improved by 30%, and the fan efficiency is impoved by 13%, in addition to the remarkable reduction in the reverse flow and noise level.

While each of the auxiliary blades or vanes 19, 191, 192 in the aforenoted first to third embodiments of the invention is shown as being curved outwardly, that is, of a substantially concave configuration, the vanes may be, for example, of a linear type, as shown in FIG. 12(A), of an outwardly angularly bent type having a downward inflection as shown in FIG. 12(B), or of a split type as shown in FIG. 12(C), so long as the outlet angle $\beta$ is the same as, or larger by a predetermined amount than, the inlet angle $\alpha$ of the vane.

In the first aspect of the present invention, as shown in the first to third embodiments, since a plurality of auxiliary blades or vanes are formed on the suction surface of a fan blade substantially in the direction of rotation of the fan, that is, in the width direction of the blade, and substantially aligned with the rotational axis of the fan, and since the forward end of the vane, as viewed in the direction of the rotational axis of the fan, is closer to the axis of rotation of the fan than the rear end of the vane, air streams flowing along the suction surface of the fan blade are smoothly guided by means of such vanes during the rotation of the fan. As a result, since the radial airflow generated by means of the auxiliary blades on the suction surface of the blade, and which does not normally affect the blowing action due to the absence of such auxiliary vanes in conventional fans, is, in fact, added to the axial flow produced by the pressure surface of the blade, the airflow produced by the fan of the first aspect of the present invention is increased and the air-inflow of the fan is also increased.

Since separation and turbulence of the air streams on the suction surface of the fan blade, which did not heretofore contribute to the blowing action of the air, may be eliminated or improved to a great extent by means of the radial flow, the blowing efficiency is increased and fan noise reduced. Still further, since air streams are impelled in the centrifugal or radial direction of the fan, by means of the vanes extending somewhat radially thereof, a reverse flow of air from the pressure side of the fan towards the suction side thereof is prevented. The compact fan of the first aspect may thus supply a great quantity of airflow to a large obstacle, such as, for example, an engine or other large machine, by means of the radial and axial flow.

The fourth to sixth embodiments constructed according to the second aspect of the present invention are shown in FIGS. 13-18. FIGS. 13 and 14 are perspective and cross-sectional views, respectively, of the essential part of the axial flow fan according to the fourth embodiment of the present invention, and as shown, there is provided three auxiliary blades or vanes 29 disposed upon, and projecting outwardly from, a pressure surface 18C of a blade 18 of the fan 404, the entire view of the fan 404 not being shown.

These auxiliary blades or vanes 29 have a predetermined width, length and thickness, and extend a substantial distance almost parallel to the air streams 11A and 11B, as shown in FIG. 2, which flow along the surface of the fan blade 18 when the fan is rotated in the direction of arrow 10, that is, outwardly in a somewhat radial direction of the fan from the leading edge portion 18A toward the trailing edge portion 18B of the blade 18. The vanes 29 extend convexly along the pressure or concave surface of the fan blade and at the same time curve upwardly so as to have a substantially concave configuration. In addition, the vanes 29 are serially disposed, with a predetermined spacing therebetween, in the radial direction of the fan.

In this case, an inlet angle $\alpha$ of the vane 29, that is, the inclination of the vane 29 with respect to the direction of the rotational axis of the fan in the vicinity of the leading edge 29A of the vane 29, as viewed in the direction of the rotational axis of the fan, ranges from about 0°-15°, while an outlet angle $\beta$ of the vane 29, that is, the inclination of the vane 29 with respect to the direction of the rotational axis of the fan, in the vicinity of the trailing edge 29B of the vane 29, as viewed in the direction of rotation of the fan, falls in the range of about 15°-60°.

Accordingly, when the fan 404 is rotated in the direction of arrow 10, there is created air streams 20E flowing along the pressure surface 18C of the blade 18 and being guided by the vanes 29.

Since the air streams 20E are smoothly guided by means of the auxiliary blades or vanes 29, separation or turbulence of the air does not occur even in the vicinity of the trailing edge portion 18B of the blade 18. As a result, there may be achieved advantageous results, such as, for example, an increase in the airflow and a reduction in the fan noise.

Still further, as the outlet angle $\beta$ of the vane 29 is larger than the inlet angle $\alpha$ thereof, the vane achieves the function of a blade, thus strongly impelling air streams 20E outwardly in the inclined radial direction of the blade. As a result, a centrifugal effect is added to the blowing effect of the axial flow fan, so that the air streams, thus impelled, will effectively flow in the direction away from obstacles disposed on the discharge side of the fan, such as, for example, engine 3, and the like, while parts of the air streams impinge upon the inner peripheral surface of the shroud 13 and then flow toward the discharge side of the fan 404, thus preventing a reverse flow of the air streams, that is, from the discharge side, towards the suction side, of the fan through the clearance S defined between the fan 404 and the shroud 13.

FIGS. 15 and 16 illustrate the fifth embodiment of the present invention, and according to the fifth embodiment of the invention, the length of the auxiliary blades or vanes 291 is shortened as compared with the length of vane 29 in the fourth embodiment, three vanes 291 being provided on the pressure surface 18C of the blade 18 only within the trailing edge portion 18B thereof.

In this case, since the trailing edge portion 18B of the pressure surface 18C of the blade 18 greatly contributes to the blowing action of the fan, and separation and turbulence of the air streams normally occur within the trailing edge portion of the blade surface, there may be achieved the desired blowing action and reduction in fan noise, even if the vanes 291 are provided solely upon the trailing edge portion 18B.

It is to be noted that the center of gravity G of the blade 18 is shifted to a point G1 toward the trailing edge portion 18B thereof, as shown in FIG. 16, and consequently, a centrifugal force E will be increased to $E_1$ due to the rotation of the fan 405, with a resulting increase in the moment of the blade 18, which, in turn, increases the deflection of the blade 18 from an axis OD of the blade, O representing the center of rotation of the fan. The increase in the deflection of the blade 18 reduces the horsepower required to drive the fan, and the airflow produced by the vanes 291 is likewise increased.

The blade 18 as shown in the fourth and fifth embodiments has a radially outermost tip portion which is of an arcuate configuration having its center on the axis of rotation of the fan. Alternatively, according to the sixth embodiment in which two auxiliary blades 292 are provided, as shown in FIGS. 17 and 18, the blade 18' of the fan 406 may have a tip portion 18'E which includes a small, radially outwardly projecting arcuate portion on the trailing edge side 18'B thereof so that the vane 292 may be disposed below the blade tip at the trailing edge portion.

In this embodiment, since the tip edge portion of the blade on the trailing edge side 18'B thereof is projected outwardly, relative to the inner periphery of the shroud, if any, and since the vane is extended toward and is disposed within such projected portion, the radial flow is produced at a point having a higher peripheral speed on the blade vane, and consequently, a strong radial flow may be produced. Furthermore, advantageous effects are achieved, such as, for example, an increase in the diameter of the fan, and an increase in the acting or working area of the vane 292, as well as the reduction in the number of vanes provided at the root portion of the blade, which effects a smaller blowing action, whereby the efficiency of the fan may be enhanced.

In the fourth to sixth embodiments, the provision of the vanes 29, 291 or 292 having a small radial spacing therebetween on the tip portion of the blade 18 (18'), rather than on the root portion thereof, will present better efficiency for the fan.

Test Results

An improved axial flow fan constructed according to the fourth embodiment of the present invention which is applied to an engine cooling system was compared with a fan which did not have the auxiliary blades or vanes, but under the same conditions, that is, the same outer diameter and the same number of blades per fan.

Figure 19:
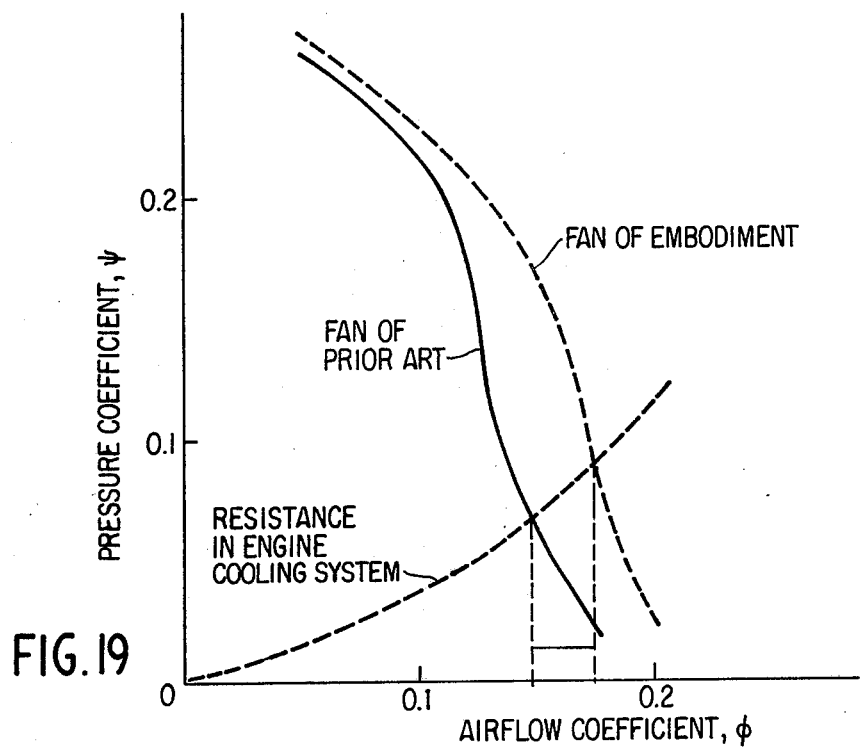
FIGS. 19 and 20 show characteristic curves illustrating the comparison in the performance of the axial flow fan according to the fourth embodiment of the present invention, which is applied to an engine cooling system, with that of the axial flow fan according to the prior art.
Figure 20:
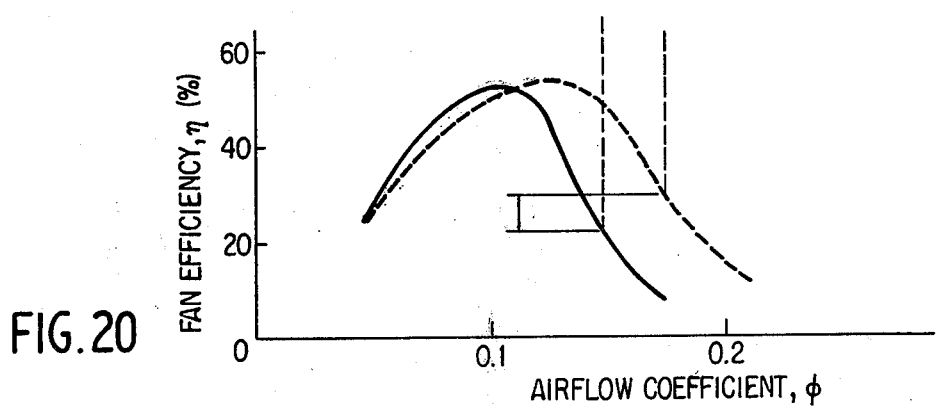

The fan according to the present invention was characterized as follows:

1. The outer diameter of the fan and the number of blades: 360φ-6
2. Auxiliary blades or vanes, provided on the pressure surface of the blade:
    (a) number of vanes and spacing of vanes: 3 vanes/fan blade, 30 mm apart
    (b) inlet angle: 5°
    (c) outlet angle: 34°
    (d) width (height): 10 mm FIGS. 19 and 20 show the characteristic curves of both fans. In FIG. 19, the ordinate shows the pressure coefficient $\psi$ and the abscissa shows the airflow coefficient $\phi$, while in FIG. 20, the ordinate shows the fan efficiency $\eta$ and the abscissa shows the airflow coefficient $\phi$. The comparison of the fan according to the present invention with the prior art fan reveals that according to the present invention, the airflow is improved by 20%, the fan efficiency is improved by 8%, and in addition, there is a remarkable reduction in the reverse flow and noise level.

Figures 21A, 21B, 21C, 21D, 21E:
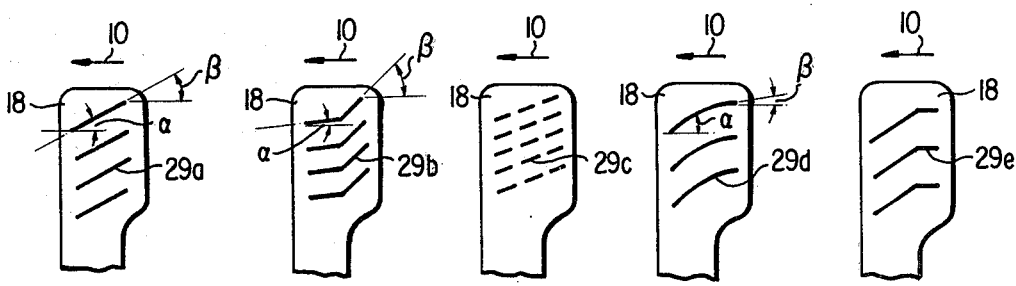
FIGS. 21(A)–21(E) are schematic views illustrating modifications of the auxiliary blades in the fourth to sixth embodiments of the present invention.

While each of the auxiliary blades or vanes, 29, 291, 292 in the aforenoted fourth to sixth embodiments of the invention is shown as being curved upwardly, that is, of a substantially concave configuration, the vanes may be, for example, of a linear type as seen in FIG. 21(A), of an outwardly angularly bent type having a downward inflection as seen in FIG. 21(C), so long as the outlet angle $\beta$ is the same as, or larger by a predetermined amount than, the inlet angle $\alpha$ of the vane.

In the second aspect of the present invention as shown in the fourth to sixth embodiments, since a plurality of auxiliary blades or vanes are formed on the pressure surface of a fan blade substantially in the direction of the rotational axis of the fan, that is, in the width direction of the blade, and since the forward end of the vane, as viewed in the direction of the rotational axis of the fan, is positioned closer to the axis of the rotation of the fan than the rear end of the vane, radial or centrifugal air streams, flowing along the pressure surface of the fan blade and smoothly guided by means of the vanes during the rotation of the fan, are produced in addition to the axial flow produced by the pressure surface of the blade. As a result, the airflow produced by the fan of this second aspect is increased and the airinflow of the fan is also increased. Since separation and turbulence of the air streams on the pressure surface of the fan blade may be prevented by the radial flow, the efficiency of the fan is also enhanced and fan noise is reduced. Furthermore, due to the air streams being impelled outwardly in the inclined radial direction of the fan blade, a reverse flow of air, through the clearance S defined between the fan blade and the shroud, is reduced. The compact fan of the second aspect may thus supply a great quantity of airflow to a large obstacle, such as, for example, an engine or other large machine, by means of the axial and radial flows.

Figure 22:
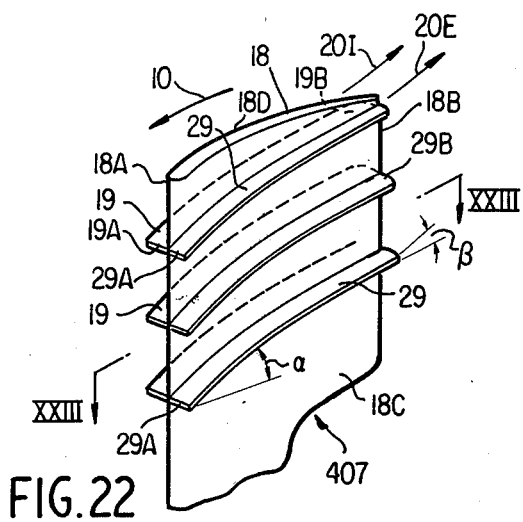
FIG. 22 is a perspective view of the seventh embodiment of the present invention.
Figure 23:
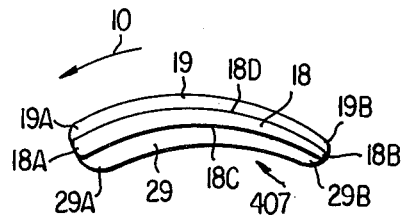
FIG. 23 is a cross-sectional view taken along the line XXIII—XXIII of FIG. 22.

The seventh to ninth embodiments constructed according to the third aspect of the present invention are shown in FIGS. 22-27. FIGS. 22 and 23 are a perspective view and a cross-sectional view, respectively, of the essential part of the axial flow fan according to the seventh embodiment of the present invention, and as shown, there is provided three auxiliary blades or vanes 19 which are disposed on, and project outwardly from, a suction surface 18D of a blade 18 of a fan 407, and three auxiliary blades or vanes 29 similarly disposed on a pressure surface 18C of blade 18 of fan 407, the entire view of the fan 407 not being shown.

The auxiliary blades or vanes 19 are of the same configuration as those of the first embodiment, as shown in FIGS. 4 and 5, and are similarly provided as in the first embodiment, while the auxiliary blades or vanes 29 are of the same configuration as those of the fourth embodiment, as shown in FIGS. 13 and 14, and are similarly provided as in the fourth embodiment.

Accordingly, when the fan 407 is rotated in the direction of arrow 10, there is created air streams 20I and 20E which flow along the vanes 19 and 29, respectively. Thus, by the provision of vanes 19 on the suction surface 18D, and the vanes 29 on the pressure surface 18C, of the blade 18 according to this seventh embodiment, there can be provided an axial flow fan 407 having the effects of both the first and fourth embodiments.

Figure 24:
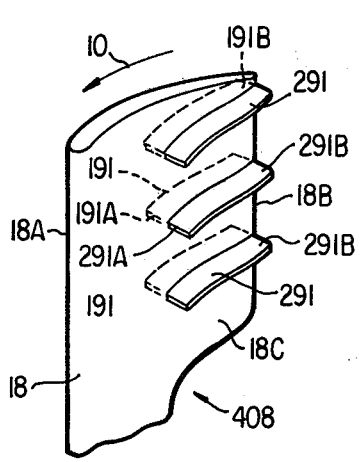
FIGS. 24 and 25 are perspective and front views, respectively, illustrating the eighth embodiment of the present invention.
Figure 25:
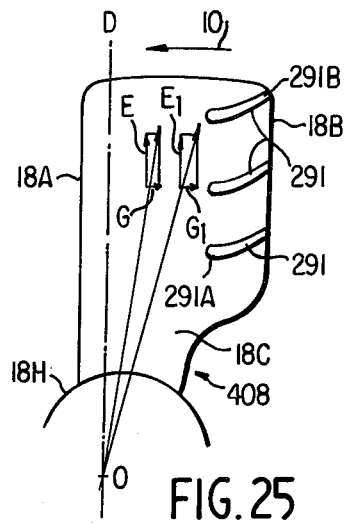

FIGS. 24 and 25 illustrate the eighth embodiment of the invention, according to which, the length of the auxiliary blades or vanes 191 and 291 is shortened as compared with the length of the auxiliary blades or vanes 19 and 29 in the seventh embodiment, such vanes 191 and 291 being provided on the suction surface 18D, and on the pressure surface 18C of the blade 18, respectively, and only within the trailing edge portion 18B thereof. As a result, according to this embodiment, there is provided the axial flow fan having the effects of both the second and fifth embodiments.

Figure 26:
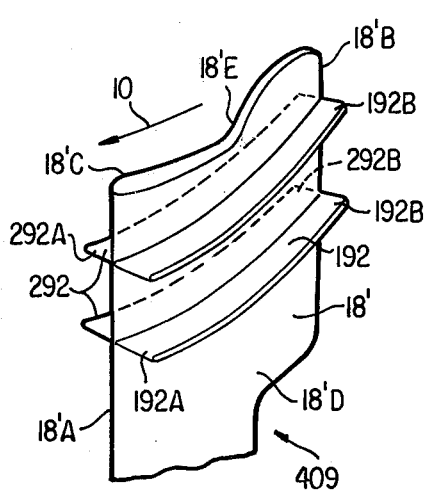
FIGS. 26 and 27 are perspective and front views, respectively, of the ninth embodiment of the present invention.
Figure 27:
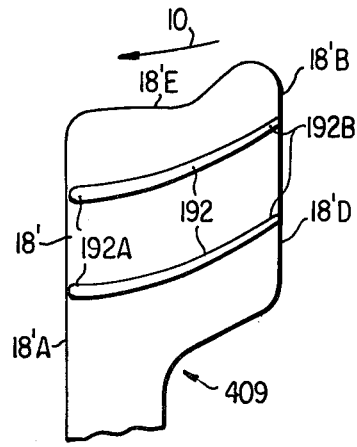

The blade 18 as shown in the seventh and eighth embodiments has an outermost tip which is of an arcuate configuration having its center disposed on the axis of rotation of the fan. Alternatively, according to the ninth embodiment in which two auxiliary blades 192 and 292 are provided on both the suction surface 18'D and on the pressure surface 18′C, respectively, as shown in FIGS. 26 and 27, the blade 18′ of the fan 409 may have a tip edge portion 18′E including a small, radially outwardly projecting arcuate portion on the trailing edge side 18′B thereof so that the vanes 192 and 292 may be disposed therebelow and not extend to the tip edge portion, and the axial flow fan according to this embodiment has the effects of the above-mentioned third and sixth embodiments.

In the seventh to ninth embodiments, the provision of the auxiliary blades or vanes 19, 191, 192 and 29, 291, 292, with a small radial spacing therebetween, on the tip portion of the blade 18 (18′), rather than on the root portion thereof, will present a better efficiency for the fan.

Test Results

An improved axial flow fan according to this seventh embodiment of the present invention, which may be applied to an engine cooling system, as compared with a fan which did not have the auxiliary blades or vanes and under the same conditions, that is, the same outer diameter and the same number of blades per fan.

Figure 28:
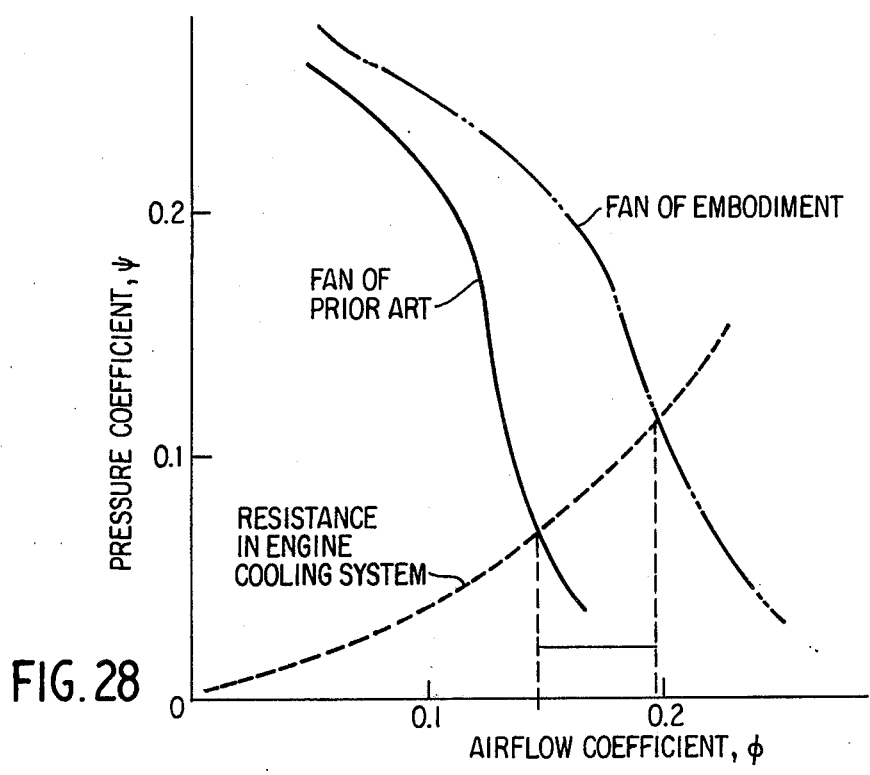
FIGS. 28 and 29 show characteristic curves illustrating the comparison in performance of the axial flow fan according to the seventh embodiment of the present invention, which is applied to an engine cooling system, with that of the axial flow fan according to the prior art.
Figure 29:
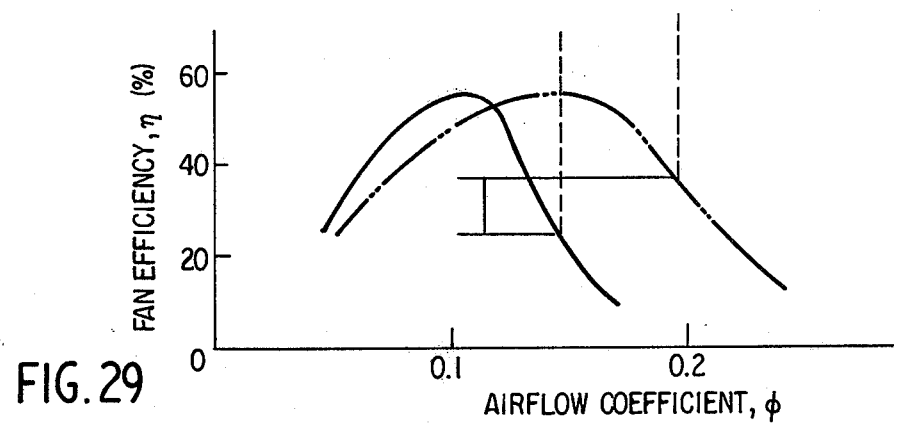

The fan according to the present invention was characterized as follows:

1. The outer diameter of the fan and the number of blades. 360$\phi$-6
2. Auxiliary blades or vanes, provided on both surfaces of the blades:
  (a) number of vanes and spacing of vanes: 3 vanes/fan blade, 30 mm apart
  (b) inlet angle $\alpha$: 5°
  (c) outlet angle $\beta$: 34°
  (d) width (height): 10 mm FIGS. 28 and 29 show the characteristic curves of both fans. In FIG. 28, the ordinate shows the pressure coefficient $\psi$ and the abscissa shows the airflow coefficient $\phi$, while in FIG. 29, the ordinate shows the fan efficiency $\eta$ and the abscissa shows the airflow coefficient $\phi$. The comparison of the fan according to the present invention with the prior art fan reveals that according to the present invention, the airflow is improved by 35%, and the fan efficiency is improved by 14%, in addition to a remarkable reduction in reverse flow and noise level.

While each of the vanes in the seventh to ninth embodiments of the invention is shown as being curved outwardly, that is, of a substantially concave configuration, the vanes may be, for example, of a linear type, of an outwardly angularly bent type having a downward inflection, or of a split type as shown in FIGS. 12(A)-12(C) and 21(A)-21(C), so long as the outlet angle $\beta$ is the same as, or larger by a predetermined amount than, the inlet angle $\alpha$ of the vane.

In the third aspect of the present invention as shown in the seventh to ninth embodiments, there can thus be provided an axial flow fan having the effects of both the first and second aspects of the invention. Namely, as the radial airflows produced by the auxiliary blades on the suction and pressure surfaces of the blade is added to the axial flow produced by the pressure surface of the blade, the airflow produced by the fan of the third aspect is increased, and the air-inflow of the fan is also increased. In addition, as the separation and turbulence of the air streams on the suction and pressure surfaces of the fan blade may be eliminated by the radial flow, the blowing efficiency is enhanced and fan noise is reduced. Furthermore, a reverse flow of air from the pressure side, towards the suction side, of the blade is prevented by the strong radial flow, and thus, the compact fan of the third aspect may supply a great quantity of airflow to a large obstacle, such as, for example, an engine or other large machine, by means of the axial and radial flows.

The tenth to fourteenth embodiments according to the fourth aspect of the present invention are shown in FIGS. 30 to 41. FIGS. 30-33 show the tenth embodiment of an axial flow fan according to the present invention. Provided on the suction surface 18D of the blade 18 of the fan 410 are auxiliary blades or vanes 39 and 391 which project perpendicularly from the blade surface. The vanes 39 and 391 have predetermined widths, about 8-20 mm, lengths and thicknesses, and extend substantially the entire width of the fan blade so as to be aligned with air streams 11A and 11B which flow along the surface of the fan blade during rotation of the fan 410 in the direction of arrow 10. More particularly, the vanes extend somewhat radially outwardly, from the leading edge portion 18A to the trailing edge portion 18B, and are positioned with a given spacing therebetween in the radial direction. Furthermore, the vanes 39 and 391 extend concavely along the suction, that is, convex, surface 18D of the blade and, at the same time, vanes 39 and 391 are themselves curved upwardly, that is, are of a substantially concave configuration.

In this case, an inlet angle $\alpha_1$, at the leading edge 39A of the outer vane 39 positioned farthest from the center of rotation of the fan 410 is set to have an angle of about 0°-15°, while an outlet angle $\beta_1$ at the trailing edge 39B of the vane, is set to have an angle of about 15°-60°. A setting angle $\theta_1$ of the vane 39 with respect to the surface of fan blade 18 is set to have an angle of about 5-30°, and what is meant by an inlet angle $\alpha_1$, as used herein, is an inclined angle at the leading edge 39A of the vane 39 with respect to the axis of rotation of the fan, and what is meant by the outlet angle $\beta_1$ is an inclined angle at the trailing edge 39B with respect to the axis of rotation of the fan. In addition, defined as a setting angle $\theta_1$ herein is an inclined angle of a line, connecting the leading edge 39A to the trailing edge 39B of the vane 39, with respect to the axis of rotation of the fan.

Figure 30:
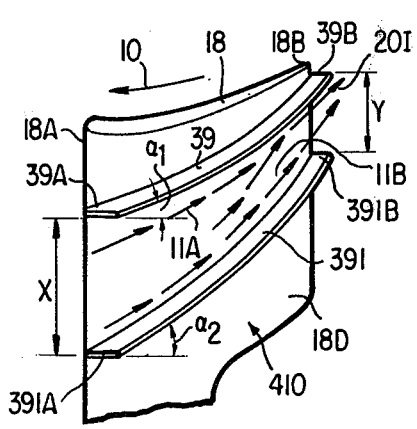
FIGS. 30 and 31 are perspective and front views, respectively, showing the tenth embodiment of the present invention.
Figure 31:
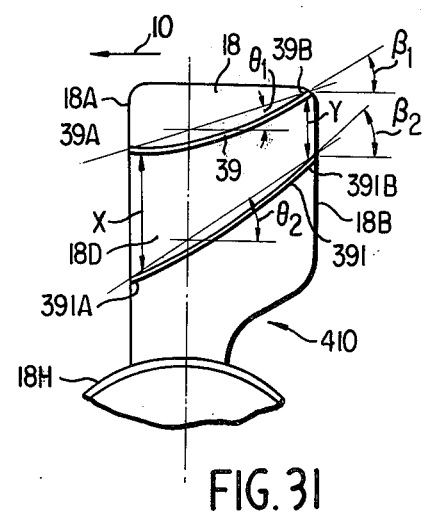
Figure 32:
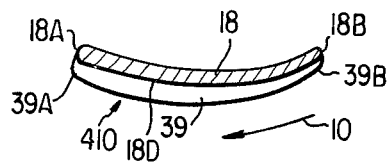
FIG. 32 is a cross-sectional view of the fan blade of FIG. 31.
Figure 33:
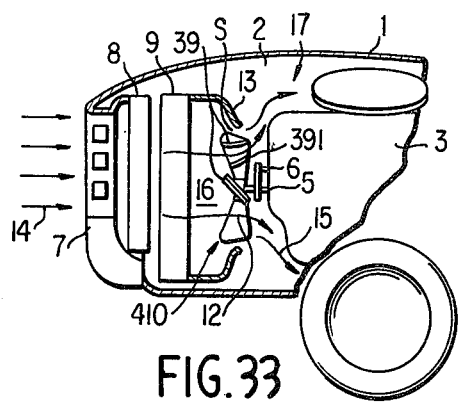
FIG. 33 is a view similar to that of FIG. 1 having the fan blades of FIG. 30 incorporated therein.

As shown in FIGS. 30 and 31, a spacing X defined between the leading edge 39A of the outer vane 39 and the leading edge 391A of the inner vane 391 which is positioned closer to the center of rotation of the fan is larger than a spacing Y defined between the trailing edges 39B and 391B of the vanes 39 and 391. In other words, the setting angle $\theta_2$, inlet angle $\alpha_2$ and outlet angle $\beta_2$ of the vane 391 are larger than the setting angle $\theta_1$, inlet angle $\alpha_1$ and outlet angle $\beta_1$ of the vane 39, respectively.

A description will now be given of the function and effects of the axial flow fan 410, having the vanes 39 and 391, constructed according to this embodiment, which is applied to an engine cooling system of a motor vehicle as seen, for example, in FIG. 1. When the axial flow fan 410 is rotated in the direction of arrow 10, there is produced air streams 201 on the suction surface 18D of the fan blade 18 along the vanes 39 and 391. Accordingly, the same effects as in the first embodiment are obtained. Furthermore, in this embodiment, since the setting angle $\theta_2$, inlet angle $\alpha_2$ and outlet angle $\beta_2$ of the vane 391 are larger than those of the vane 39, there is produced air streams which are strongly impelled in the centrifugal direction, such streams being guided along the undersurface of the vane 39 and then discharged at the trailing edge of the blade 18 as strongly impelled centrifugal streams with a rapid velocity. In addition, there also occurs a blowing action by means of the vane 391 even at a position closer to the rotational center of the fan blade. As a result, the effects obtained in the first embodiment are further enhanced in this embodiment.

Figure 34:
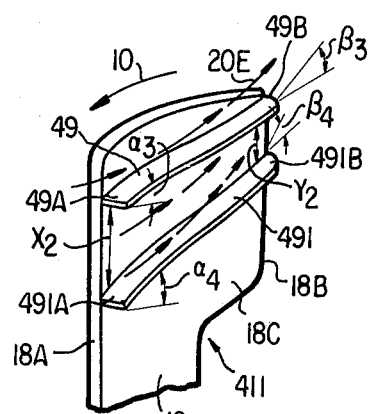
FIGS. 34 and 35 are perspective and cross-sectional views, respectively, of the eleventh embodiment of the present invention.
Figure 35:
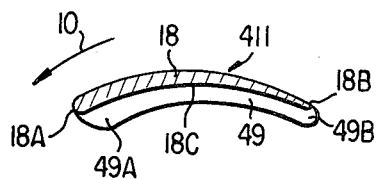

FIGS. 34 and 35 show the eleventh embodiment of the present invention, wherein there is provided perpendicularly projecting auxiliary blades or vanes 49 and 491 which are similar to those of the tenth embodiment, but are disposed on the pressure surface 18C of the blade 18 of the fan 411. As in the tenth embodiment, with respect to the radially outer vane 49, the setting angle $\theta_3$, not shown, is about 5°–30°, the inlet angle $\alpha_3$ is about 0°–15°, and the outlet angle $\beta_3$ is about 15°–60°, and with respect to the radially inner vane 491, the setting angle $\theta_4$, not shown, inlet angle $\alpha_4$, and outlet angle $\beta_4$, are larger than those of the vane 49. Namely, as shown in FIG. 34, a spacing $X_2$ defined between the leading edges 49A and 491A of the vanes 49 and 491, is larger than a spacing $Y_2$ defined between the trailing edges 49B and 491B of the vanes 49 and 491.

When the axial flow fan 411 is rotated in the direction of arrow 10, there is produced air streams 20E on the pressure surface 18C of the fan blade 18 along the vanes 49 and 491. Accordingly, the same effects as in the fourth embodiment are obtained. Furthermore, in this embodiment, as in the tenth embodiment, since the setting angle $\theta_4$, inlet angle $\alpha_4$ and outlet angle $\beta_4$ of the vane 491 are larger than those of the vane 49, there is produced air streams which are strongly impelled in the centrifugal direction, such streams being guided along the undersurface of the vane 49 and then discharged at the trailing edge of the blade 18 as strongly impelled centrifugal streams with a rapid velocity. As a result, the combined effects of the fourth and tenth embodiments are obtained in this embodiment.

Figure 36:
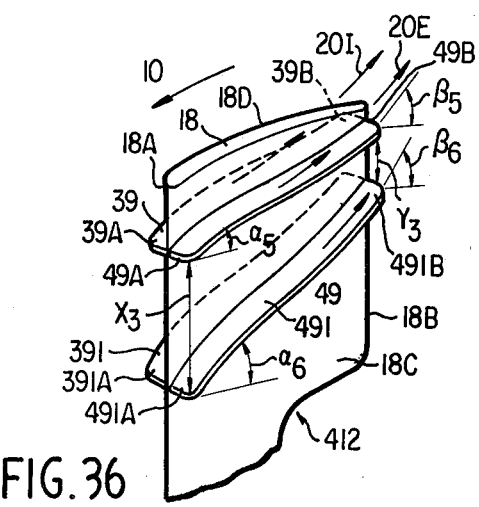
FIGS. 36 and 37 are perspective and cross-sectional views, respectively, illustrating the twelfth embodiment of the present invention.
Figure 37:
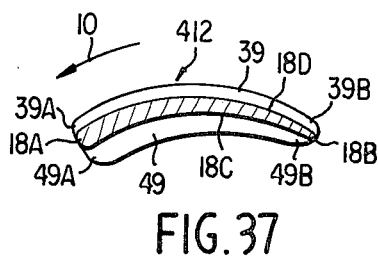

FIGS. 36 and 37 show the twelfth embodiment of the present invention. In this embodiment, there is provided perpendicularly projecting auxiliary blades or vanes 39 and 391 on the suction surface 18D and auxiliary blades or vanes 49 and 491 on the pressure surface 18C of the blade 18 of a fan 412. As in the tenth and eleventh embodiments, with respect to the radially outer vanes 39 and 49, the setting angle $\theta_5$, not shown, is about 5°–30°, the inlet angle $\alpha_5$ is about 0°–15°, and the outlet angle $\beta_5$ is about 15°–60°, and with respect to the radially inner vanes 391 and 491, the setting angle $\theta_6$, inlet angle $\alpha_6$, and outlet angle $\beta_6$ are larger than those of the vanes 39 and 49. Namely, as shown in FIG. 36, a spacing $X_3$, defined between the leading edges 39A and 391A or 49A and 491A of the vanes 39 and 391 or 49 and 491, is larger than a spacing $Y_3$ defined between the trailing edges 39B and 391B or 49B and 491B, of the vanes 39 and 391 or 49 and 491.

When the axial flow fan 412 is rotated in the direction of arrow 10, there is produced air streams 20I, as in the tenth embodiment, on the suction surface 18D along the vanes 39 and 391, and 20E, as in the eleventh embodiment, on the pressure surface 18C along the vanes 49 and 491, and thus, the combined effects of the tenth and eleventh embodiments are obtained in this embodiment.

Figure 38:
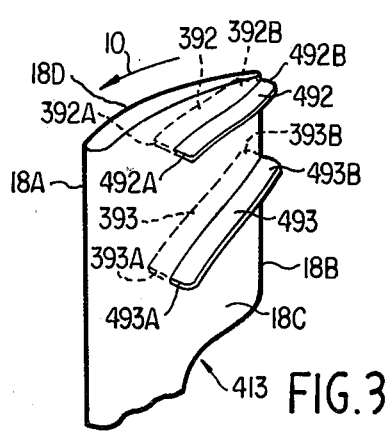
FIGS. 38 and 39 are perspective and front views, respectively, illustrating the thirteenth embodiment of the present invention.
Figure 39:
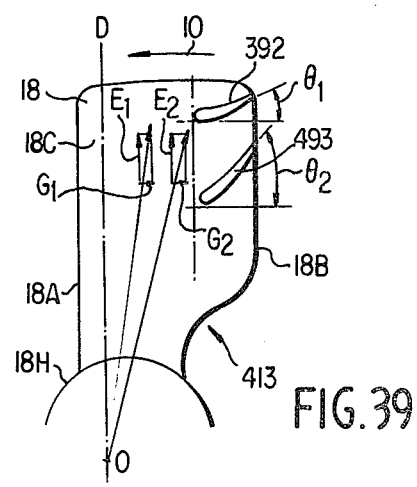

FIGS. 38 and 39 show the thirteeth embodiment of the present invention wherein there is provided perpendicularly projecting auxiliary blades or vanes 392 and 393 on the suction surface 18D and perpendicularly projecting auxiliary blades or vanes 492 and 493 on the pressure surface 18C of the blade 18 of a fan 413 as in the twelfth embodiment. However, the length of each of the vanes is shortened as compared with the length of each vane in the twelfth embodiment. That is, each vane is provided only within the trailing edge portion 18B of each blade surface, as in the eighth embodiment, and furthermore, the spacing between the leading edges 392A and 393A, or 492A and 493A, is larger than the spacing between the trailing edges 392B and 393B or 492B and 493B, as in the twelfth embodiment, and thus, the combined effects of the eighth, or second and fifth, embodiment and the twelfth embodiment are obtained in this embodiment.

Figure 40:
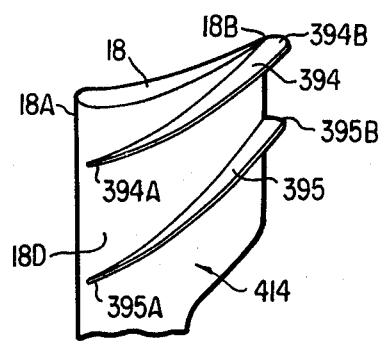
FIGS. 40 and 41 are perspective and cross-sectional views, respectively, illustrating the fourteenth embodiment of the present invention.
Figure 41:
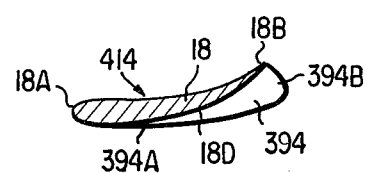

FIGS. 40 and 41 show the fourteenth embodiment of the present invention wherein there is provided perpendicularly projecting auxiliary blades or vanes 394A and 395 on the suction surface 18D of the blade 18 of th fan 414, and unlike the previous embodiments, the width of the vane 394 or 395 at the leading edge 394A or 395A is small as compared with the width thereof at the trailing edge 394B or 395B. Generally, the trailing edge side of the blade surface contributes more to the blowing action than the leading edge side thereof, and separation and turbulence of the air streams occurs more easily on this part, however, noises, partly attributable to the noise due to the rotation of the blades through the air and turbulence of air, are caused at the leading edge of the vane. Therefore, according to this embodiment, in which the width of each vane is reduced to almost zero at the leading edge, and gradually increased toward the trailing edge, the noise can be further reduced without affecting the efficiency of the fan.

Furthermore, this configuration of the vanes at the leading edge portion can avoid projection of the vanes over the length of the blade in the width direction thereof and in the direction parallel to the axis of the fan. Therefore, the axial flow fan with these vanes can be installed even in a narrow place, such as, for example, in an engine compartment of a motor vehicle. So as to occupy the same space as that required for the prior art fan. In addition, this type of fan protects an operator's hands from being wounded due to projections, and provides excellent workability for mass production. Still further, the vanes having this configuration may be provided on the pressure side 18C of the fan blade.

Tests were conducted with the axial flow fan 410 according to the tenth embodiment as applied to an engine cooling system, as well as to the prior art axial flow fan having no auxiliary blades or vanes thereon, under the same conditions of outer fan diameter and number of blades, for comparing the same.

Figure 42:
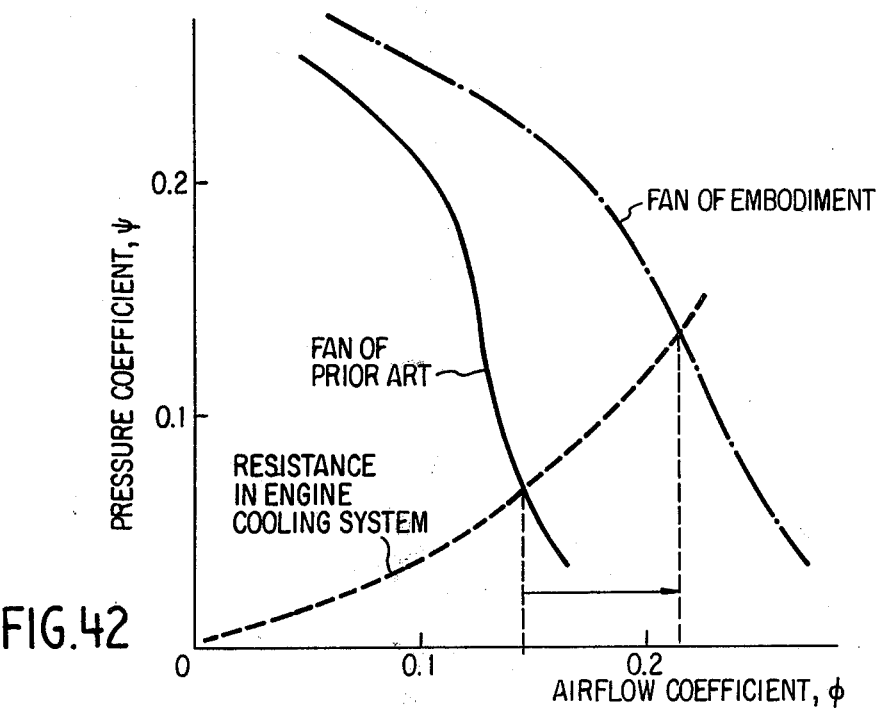
FIGS. 42 and 43 are plots comparing the performance of the axial flow fan according to the tenth embodiment of the present invention, which is applied to an engine cooling system, with that of the axial flow fan of the prior art.
Figure 43:
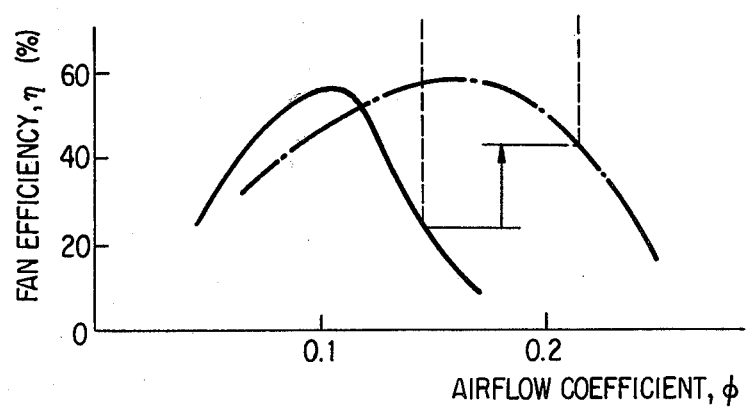

The axial flow fan 410 was characterized as follows:
1. Outer diameter of fan and number of blades: 360$\phi$-6
2. Auxiliary blades or vanes, provided on the suction surface
 (a) number of vanes: 2/fan blade
 (b) setting angle
 radially outer vane 39 ... $\theta_1$ ... 12°
 radially inner vane 391 ... $\theta_2$ ... 23°
 (c) outlet angle
 radially outer vane 39 ... $\beta_1$ ... 25°
 radially inner vane 391 ... $\beta_2$ ... 50°
 (d) spacing of leading edge portions of vanes as viewed in the axis of rotation of the blade: 48 mm
 (e) spacing of trailing edge portions of vanes as viewed in the axis of rotation of the blade: 30 mm FIGS. 42 and 43 show the characteristic curves of both axial flow fans. The axial flow fan 410 according to the tenth embodiment is superior to the prior art axial flow fan in that the airflow is increased by 40%, the efficiency is increased by 20%, and the noise level and reverse flow are greatly reduced.

Figure 44A:
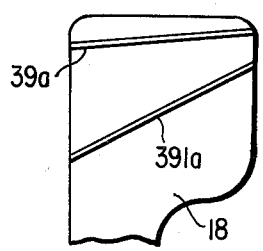
FIGS. 44(A)–44(K) are schematic views illustrating modifications of the auxiliary blades in the tenth to fourteenth embodiments according to the present invention.
Figure 44B:
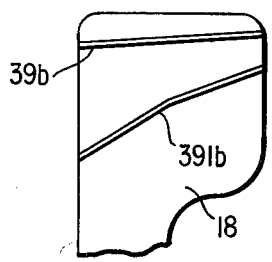
Figure 44C:
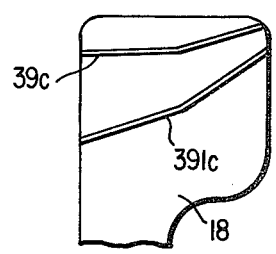
Figure 44D:
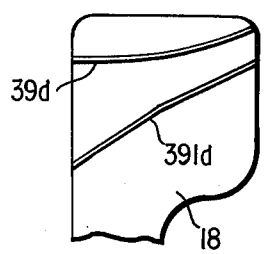
Figure 44E:
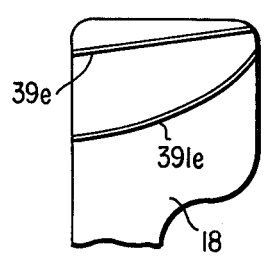
Figure 44F:
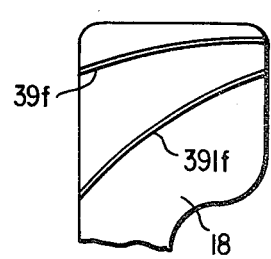
Figure 44G:
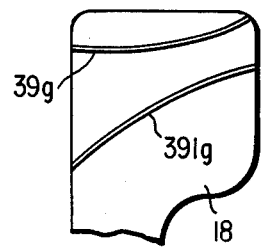
Figure 44H:
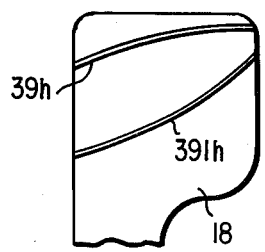
Figure 44I:
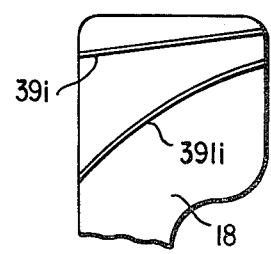
Figure 44J:
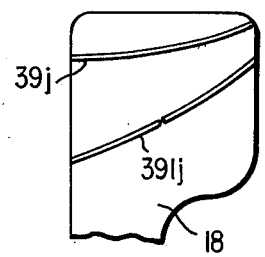
Figure 44K:
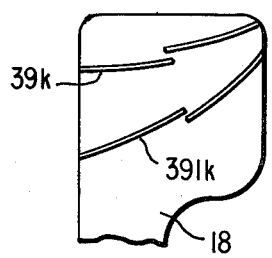

In the above tenth to fourteenth embodiments, as long as the vanes are provided in such a manner that the spacing between the leading edges of the radially inner vanes is larger than the spacing between the trailing edges thereof, and as long as the outlet angle is the same as, or larger than the inlet angle for each vane, the shape of the vanes is not limited to a substantially concave configuration, that is, a curved configuration having a downward inflection, but may be of any combination of straight lines as seen in FIG. 44(A), a plurality of angularly bent lines each having a downward inflection as seen in FIG. 44(C), a straight line and a curved line having a downward inflection as seen in FIG. 44(E), a curved line and a split line each having a downward inflection as seen in FIG. 44(J), or a plurality of nonconnected curved lines having diferent positive inclinations as seen in FIG. 44(K).

In the fourth aspect of the present invention as shown in the tenth to fourteenth embodiments, since the distance between the two adjacent auxiliary blades at the leading edges thereof, in the radial direction of the blade, is larger than that at the trailing edges thereof, and since the setting angle and outet angle of the inner auxiliary vane, with respect to the blade, is larger than that of the outer auxiliary blade, airflow is guided from an inner portion of low peripheral velocity, to an outer portion of high peripheral velocity, of the blade by the inner auxiliary blade, and a stronger radial flow, with high velocity along the auxiliary blade, may be produced than can be produced in the first to third aspects of the present invention, the inner portion of the blade effectively operating for blowing.

Accordingly, the fourth aspect of the present invention may produce a greater quantity of airflow, may increase the blowing efficiency more than the first and third aspects of the present invention, and furthermore, in the fourth aspect, the fan noise and reverse flow are more effectively reduced than in the first to third aspects of the present invention. The compact fan of the fourth aspect may thus supply a great quantity of airflow to a large obstacle, such as, for example, an engine or other large machine, by means of the radial and axial flows.

The fifteenth to twentyfourth embodiments, constructed according to the fifth aspect of the present invention, are shown in FIGS. 45-65, FIGS. 45-51 showing the fifteenth embodiment of an axial flow fan according to the present invention. Projecting from the suction surface 18D of the blade 18 of the fan 415 are a plurality of auxiliary blades or vanes 59 and 591 which have a predetermined width (about 8-20 mm), length and thickness. The vanes 59 and 591 extend substantially in the width direction of the fan blade and in line with air streams 11A and 11B flowing along the surface of the fan blade during rotation of the fan 415 in the direction of arrow 10. The vanes thus extend somewhat radially outwardly from the leading edge portion 18A to the trailing edge portion 18B, the width thereof being gradually increased. Furthermore, the vanes 59 and 591 extend concavely along the suction, that is, the convex, surface 18D of the blade, and at the same time, the vanes 59 and 591 themselves are curved upwardly, that is, are of a substantially concave configuration, the vanes being serially positioned with a given spacing therebetween in the raidal direction.

In this case, an inlet angle $\alpha 1$ at the leading edge 59A of the vane 59 which is positioned farther from the center of rotation of the fan 415, is set to an angle of about 0°–15°, while an outlet angle $\beta 1$ at the trailing edge 59B of the vane is set to an angle of about 15°–60°. A setting angle $\theta 1$ of the vane 59, with respect to surface of fan blade 18, is set to an angle of about 5°–30°, and what is meant by an inlet angle $\alpha 1$, as used herein, is an inclined angle at the leading edge 59A of the vane 59 with respect to the axis of rotation of the fan, and what is meant by an outlet angle $\beta 1$ is an inclined angle at the trailing edge 59B with respect to the axis of rotation of the fan. In addition, defined as the setting angle $\theta$, is an inclined angle of a line, connecting the leading edge 59A to the trailing edge 59B of the vane 59, with respect to the axis of rotation of the fan.

Figure 45:
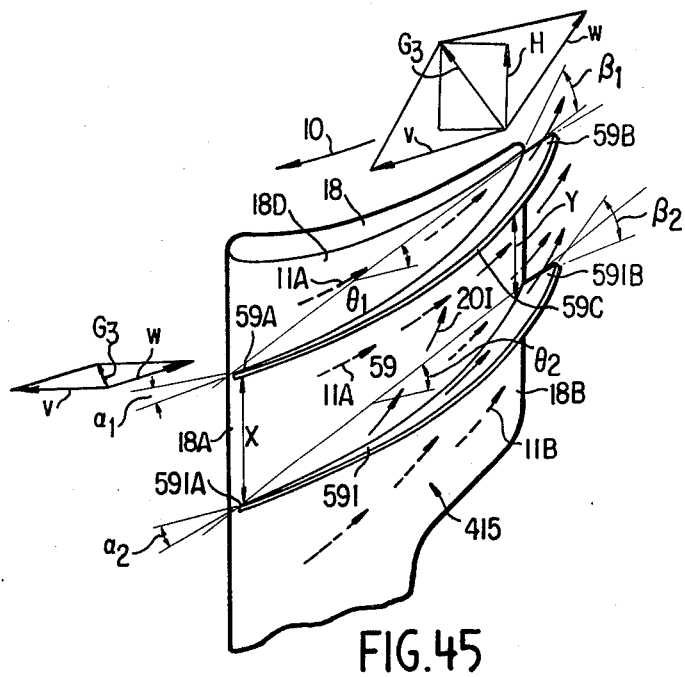
FIGS. 45 and 46 are perspective and front views, respectively illustrating the fifteenth embodiment of the present invention.
Figure 46:
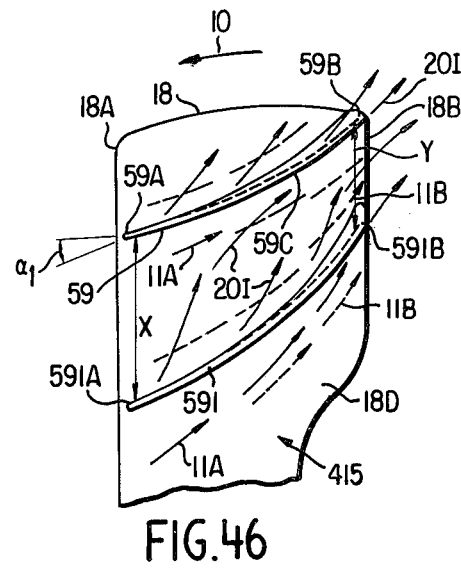

The vane 591 is positioned closer to the center of rotation of the fan than the vane 59, and as shown in FIGS. 45 and 46, a distance or spacing X between the leading edge 59A of the vane 59 and the leading edge 591A of the vane 591 is longer than a distance or spacing $\gamma$ defined between the trailing edges 59B and 591B of the vanes 59 and 591. In other words, the setting angle $\theta 2$, inlet angle $\alpha 2$, and outlet angle $\beta 2$ of the vane 591 are larger than the setting angle $\theta$, inlet angle $\alpha 1$, and outlet angle $\beta 1$ of the vane 59, respectively.

Figure 49:
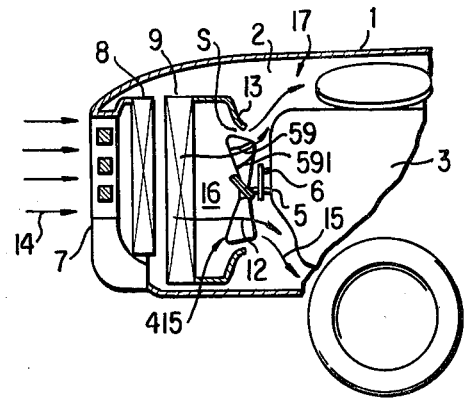
FIG. 49 is a view similar to that of FIG. 1 showing however the incorporation of the fan blades of FIG. 45 therein.
Figure 50:
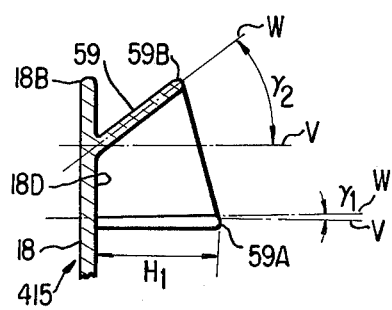
FIG. 50 is a partial, transverse elevation view, partly in cross-section, of the fan blade of FIG. 45.
Figure 51:
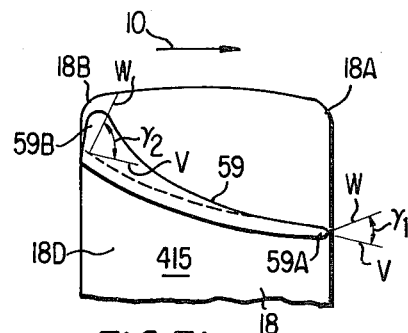
FIG. 51 is a plan view of the fan blade of FIG. 45.

As shown in FIGS. 45-51, the vanes formed on the suction surface 18D of the fan blade 18 are inclined over the whole length thereof transversely outwardly so as to provide predetermined acute angles between the vane and the blade surface, the actue angles being in a range from substantially perpendicular to the blade surface to being substantially parallel thereto. More particularly, as shown in FIGS. 50 and 51, angle $\gamma 1$ of the vane 59 or 591, which is formed between the perpendicular axis V with respect to the suction surface 18D of the fan blade and the projecting axis W of the vane, is gradually increased to angle $\gamma 2$ as one proceeds from the leading edge 59A or 591A to the trailing edge 59B or 591B, respectively, vane 591 not being shown.

In this case, the inclined angle $\gamma 1$ at the leading edge 59A or 591A may range from about 0°–10°, while the inclined angle $\gamma 2$ at the trailing edge 59B or 591B may range from about 15°–45°.

Figure 1:
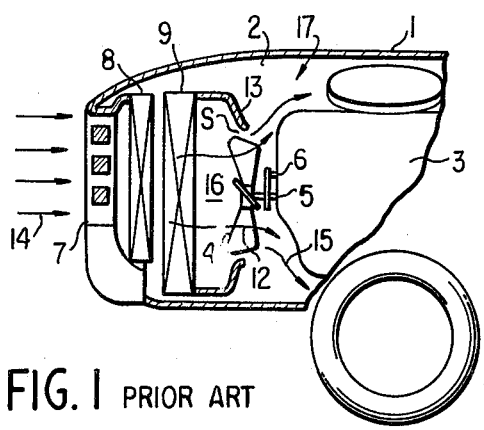
FIG. 1 is a side elevation view, partly in cross-section, illustrating an engine cooling system of a motor vehicle, using an axial flow fan according to the prior art.

A description will now be given with respect to the function and effects of the axial flow fan 415 having the vanes 59 and 591 according to this embodiment, which is applied to an engine cooling system of a motor vehicle, as seen in FIG. 1. When the axial flow fan 415, shown in FIG. 49, is rotated in the direction of arrow 10, there is produced air streams 201, on the suction surface 18D of the fan blade 18 by means of the vanes 59 and 591, which are strongly impelled and guided in the centrifugal direction along the projected vanes 59 and 591 which are inclined at the aforenoted inclined angles.

More particularly, air streams which are impelled in the centrifugal direction by means of the vane 591 are collected along the undersurface 59C of the vane 59 on the surface side disposed toward the center of rotation of the fan after traversing the suction surface 18D of the fan blade 18. Subsequently, the air streams are deflected so as to smoothly and effectively flow along the undersurface 59C of the vane 59 and be strongly impelled in the centrifugal direction from the trailing edge portion 18B of the fan blade 18. The greater the flow speed and flow rate of air in the centrifugal direction, the more effectively the air streams impelled in the centrifugal direction can block the aforenoted clearance S within an engine compartment of a motor vehicle so as to effectively prevent the reverse flow of air from the discharge side, to the suction side, of the fan. In addition, air streams may be delivered more effectively in the centrifugal direction which presents less flow resistance, particularly within the engine compartment in which there is provided various accessories for the engine, so that the airflow or quantity of the air streams passing through the radiator 9, condenser 8, and the like, may be increased, with an improvement in the cooling performance.

Still further, the aforenoted air streams in the centrifugal direction efficiently ventilate the engine compartment 2 so as to thereby eliminate heat therein, whereby the engine compartment 2 may be prevented from being exposed to heat and high temperatures, and various troubles, normally caused thereby, may be prevented. Still yet further, there is also provided centrifugal air streams inherent to the axial flow fan 415 within the area of the suction surface 18D of the fan blade 18 which is disposed below the vane 591, on the side surface disposed toward the center of rotation of the fan, and these centrifugal air streams may also be efficiently guided along the undersurface of the vane 591, thereby presenting functions and effects similar to those of the vane 59.

As noted hereinabove, an increase in airflow in the axial flow fan 415 may be achieved by increasing the flow speed and quantity of the centrifugal air streams being delivered from the trailing edge portion 18B of the fan blade 18. In addition, the centrifugal air streams produced should flow in an efficient manner, and for this purpose, the vanes 59 and 591 are inclined in this embodiment so that the air streams flowing along the vanes 59 and 591 may be prevented from impinging on the vane and undergoing an abrupt change in the direction of the air streams, the air streams thus flowing smoothly whereby the centrifugal air streams may in fact be of increased speed and quantity, the quantity of cooling air thereby being increased, and the cooling performance improved.

Figure 52:
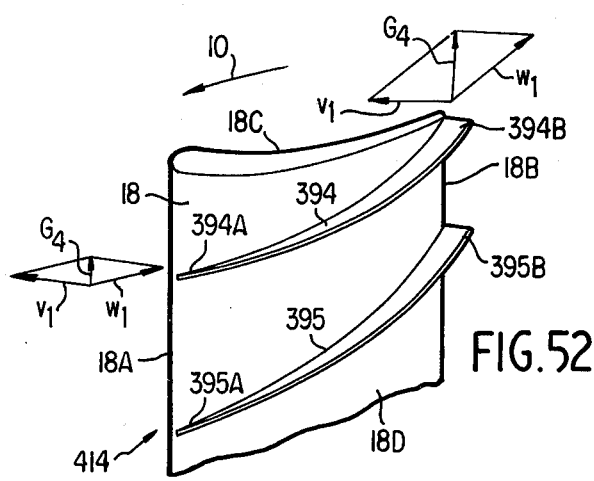
FIGS. 52–54 are perspective, transverse elevation, and cross-sectional views of the fan blades of the fourteenth embodiment of the present invention, as shown in FIGS. 40 and 41, shown herein for comparative explanation.

The following is a comparison of the axial flow fan 414 according to the fourteenth embodiment of the invention, with the axial flow fan 415 according to this embodiment, with reference being made to their functions and effects. When the axial flow fans 414 and 415 effect rotation in the direction of arrow 10, then there is produced air streams presenting a velocity triangle, on the respective surfaces of the vanes 394 and 395 and vanes 59 and 591, as shown in FIGS. 52 and 45.

Figure 53:
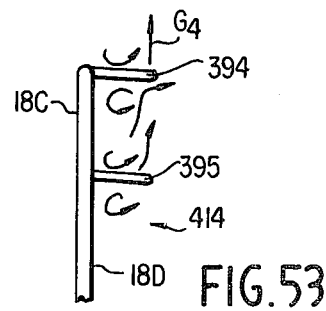
Figure 54:
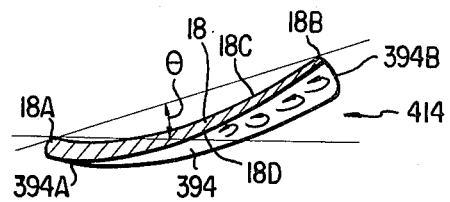

Now, considering the velocity triangles at the trailing edge portions 18B of the blades of fans 414 and 415, there occur peripheral velocities V1 and V due to the rotation of the blades, and relative velocities W1 and W of the air streams flowing outwardly along the upper or radially outer, surfaces of vanes 394 and 395 and vanes 59 and 591, so that there is obtained resultant absolute velocities $G_4$ and $G_3$. In this respect, the absolute velocities are those of the centrifugal air streams caused by the vanes 394 and 395 and vanes 59 and 591, and in addition, the velocities $G_4$ and $G_3$ act on the surfaces of vanes 394 and 395 and 59 and 591 perpendicularly thereto. According to the axial flow fan 414 of the fourteenth embodiment, as shown in FIGS. 52 to 54, the vanes 394 and 395 are formed on the surface of the fan blade 18 in a vertically projecting relationship with respect thereto so that the velocity $G_4$ acts on the surface of the fan blade 18 substantially parallelly thereto, that is, not in the direction of pressing the air against, or perpendicular to, the surface of the fan blade.

In this case, when the pitch angle H of the fan blade 18 is relatively small, there will be little or no separation of the air streams at the trailing edge portion 18B of the blade. However, when the pitch angle H is increased so as to increase the airflow, there will easily occur separation of the air streams at such portion of the blade. Therefore, as shown in FIGS. 53 and 54, the acting area of the absolute velocity $G_4$ in this case will only be the tip portions of vanes 394 and 395, or the portions close to the leading edge portions 394A and 395A of the vanes 394 and 395. That is, the acting area of the absolute velocity $G_4$ will be extremely small, or the absolute velocity $G_4$ itself will be reduced, so that the quantity of the centrifugal air streams will be reduced.

With respect to the setting angles $\theta$ and $\theta$ of the vanes 394 and 395, if such angles are relatively small, then there results little or no separation of the air streams at the trailing edge portions 394B and 395B of the vanes, particularly along the undersurfaces thereof, whereas if the setting angles $\theta$ and $\theta$ are increased so as to increase the airflow, then there results a considerable degree of separation of the air streams therefrom and considerable centrifugal air streams cannot be expected. Furthermore, even in case the vanes have relatively small setting angles $\theta$ and $\theta$, the absolute velocity $G_4$ acting on the vertical surface of the vane 395 at a right angle thereto impinges on the vane 394 adjacent thereto as shown in FIG. 53, so that the direction of the absolute velocity is forced to be deflected, thus causing aerodynamic loss and high level noise due to such impingement of the air and generated vortex noise. Accordingly, remarkable effects cannot be expected in the fan 414 as compared with the fan 415.

According to the axial flow fan 415 of this embodiment, the vanes 59 and 591 are inclined at predetermined angles relative to the surface of the fan blade 18, but the velocity triangle of the air streams will be similar to that in the axial flow fan 414. However, since the absolute velocity $G_3$ acts on the inclined surfaces of the vanes 59 and 591 perpendicularly thereto, as shown in FIG. 45, the air streams are impelled in a direction, not parallel to, but inclined to the surface of the fan blade 18. The absolute velocity $G_3$ may also be divided into a component velocity J normal to the surface of the fan blade 18 and a component velocity H parallel thereto, and the normal component velocity J acts in the direction from the top edges of the vanes 59 and 591 towards the surface of the fan blade 18, that is, in the direction opposite to the direction in which the air streams are separated from the surface of the fan blade 18. Accordingly, the normal component velocity J greatly contributes to the prevention of the separation of the air streams in the trailing edge portions 59B and 591B of vanes 59 and 591.

Figure 47:
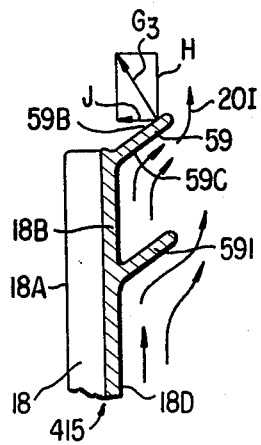
FIG. 47 is a partial, transverse cross-sectional view of the blade of FIG. 46.

On the other hand, the parallel component velocity H may be considered to be the same as the absolute velocity $G_4$ in the axial flow fan 414 whereby the parallel component velocity H generates the centrifugal air streams. The axial flow fan 415 according to this embodiment causes little or no separation of the air streams from the trailing edge portion 59B and 591B of the vanes 59 and 591, and consequently, there results considerably large centrifugal air streams, thus presenting advantages most suitable for such a fan in which there prevails a large pressure resistance between the front and rear of the fan, such as, for example, a cooling fan in a motor vehicle. Even if the parallel component velocity H acting on the inclined surface of the vane 591 impinges on the vane 59 adjacent thereto, as shown in FIG. 47, air streams will be smoothly guided along the radially inner undersurface 59C of the vane 59 because the vane 59 is inclined at the predetermined inclined angle. For these reasons, the axial flow fan 415 of this embodiment may effectively reduce the level of noise caused by vortex noise due to the separation of the airstreams, and by vibration and impingement of the air streams.

Tests were conducted with the axial flow fan 415 according to this embodiment as applied to an engine cooling system, as well as to the prior art axial flow fan having no auxiliary blades or vanes, under the same conditions of fan outer diameter and number of blades, for comparison.

The axial flow fan 415 was characterized as follows:

| | | | |
|---|---|---|---|
| 1. Outer diameter of fan and number of blades | | 360φ—6 | |
| 2. Auxiliary blades or vanes | | | |
| a) number of vanes | 2/fan blade | | |
| b) setting angle | radially outer vane 59 | α1 | 12° |
| | radially inner vane 591 | α2 | 23° |
| c) outlet angle | radially outer vane 59 | β1 | 25° |
| | radially inner vane 591 | β2 | 50° |
| d) inclined angle | radially outer vane 59 | γ1 = 0° | |
| | | γ2 = 25° | |
| | radially inner vane 591 | γ1 = 0° | |
| | | γ2 = 25° | |
| e) spacing of leading edge portions of vanes as viewed in the direction of the axis of rotation of the blade | | 48 mm | |
| f) spacing of trailing edge portions of vanes as viewed in the direction of the axis of rotation of the blade | | 30 mm | |

Figure 55:
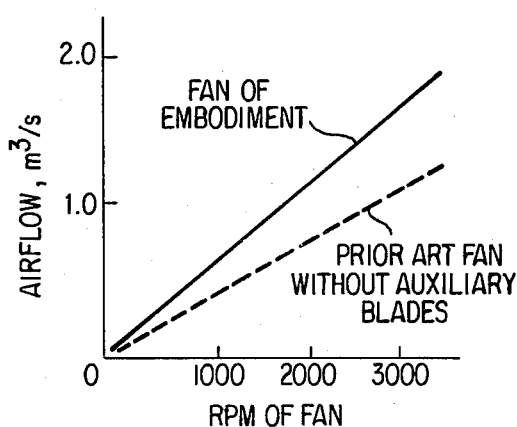
FIGS. 55 and 56 are plots comparing the performance of the axial flow fan according to the fifteenth embodiment of the present invention, which is applied to an engine cooling system, with that of the axial flow fan of the prior art.
Figure 56:
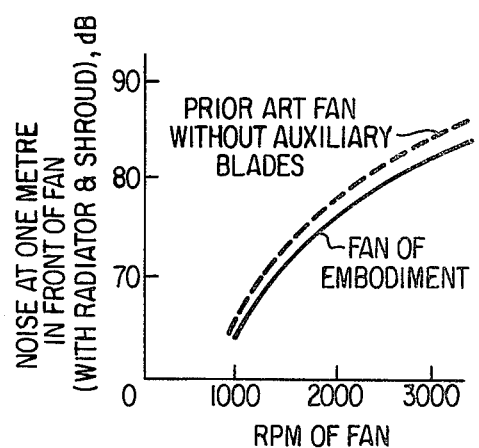

FIGS. 55 and 56 show the characteristic curves of both axial flow fans. The axial flow fan 415 according to this embodiment is superior to the prior art axial flow fan in that the airflow is increased by 35–40%, the efficiency is increased by 15–25%, the noise level is reduced by 1 dB(A), and the reverse flow is remarkably reduced.

With the axial flow fan according to this embodiment, which is applied to the engine cooling system of a motor vehicle, there may be obtained centrifugal air streams, strongly impelled by the centrifugal effects as added to the blowing action of the fan, which flow away from obstacles on the discharge side of the fan, such as, for example, an engine 3 and the like, while part of the centrifugal air streams impinges on the inner peripheral surface of the shroud 13 and is then delivered in the discharge direction, thereby presenting a considerably improved cooling performance.

Figure 57:
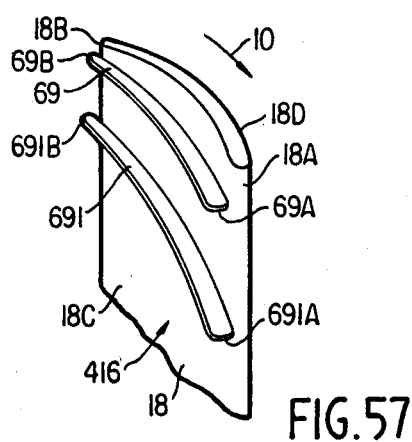
FIGS. 57–65 are perspective views illustrating the sixteenth to the twenty-fourth embodiments of the present invention, respectively.

According to the sixteenth embodiment of the present invention, as disclosed in FIG. 57, inclined vanes 69 and 691 are provided on the pressure surface 18C of the blade 18 of the fan 416 similarly to the fifteenth embodiment so that (i) the blowing action in the centrifugal direction may be enhanced on the discharge side of the fan; (ii) the combined effects of the aforenoted blowing action and the axial blowing action of the fan blade 18 may be expected; (iii) a reverse flow of air streams through the clearance S defined between the fan blade 18 and the shroud, if any, may be prevented so as to improve the efficiency and airflow of the fan; (iv) vortex flow and separation of the air streams on the respective surfaces of the fan blade 18 and vanes 69 and 691 may be eliminated; and (v) the noise level may be lowered, thus presenting advantages similar to those given by the fifteenth embodiment.

Figure 58:
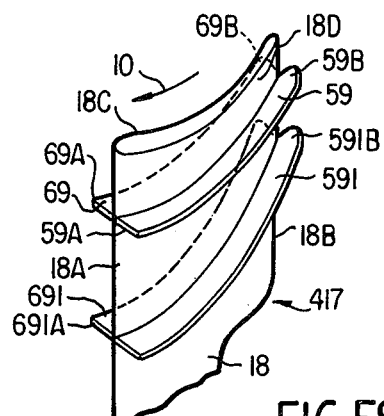

According to the seventeenth embodiment of the present invention as disclosed in FIG. 58, inclined vanes 59 and 591 are provided on the suction surface, as in the fifteenth embodiment, and inclined vanes 69 and 691 are provided on the pressure surface of the blade of the fan 417, as in the sixteenth embodiment so as to enhance the blowing and impelling actions of the fan in the centrifugal direction, whereby the axial flow fan may present the advantage of the blowing action in the centrifugal direction in addition to the blowing action of the fan blade in the axial direction, thus presenting combined advantages of the fifteenth and sixteenth embodiments.

Inclined vanes are shown in the aforenoted fifteenth to seventeenth embodiments, as having different spacings X and Y therebetween at both edges thereof, X being the spacing between the leading edge portions thereof and Y being the spacing between the trailing edge portions thereof. However, the vanes may be arranged in parallel with each other, that is, at a constant spacing therebetween, as shown in the eighteenth to twentieth embodiments.

Figure 59:
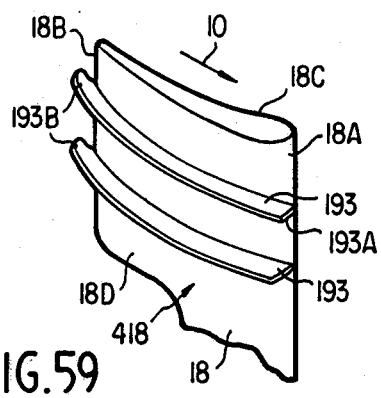

According to the eighteenth embodiment, as disclosed in FIG. 59, two vanes 193 are provided on the suction surface 18D of the blade of the fan 418, such vanes being inclined somewhat radially outwardly from the center of rotation of the fan, as in the fifteenth embodiment, but with an equal spacing therebetween at both edges thereof. As compared with the fan having the vanes formed normally to the surface of the fan blade, in addition to an axial blowing action which is inherent to the fan blade 18 on the discharge side of the fan, a blowing action of air in the centrifugal direction may be further increased on the suction surface thereof, and a reverse flow of air through the clearance S defined between the fan blade 18 and the shroud, if any, may be further reduced, thereby improving the efficiency and airflow of the fan. Furthermore, separation of the air streams and vortex noise on the surfaces of the vanes 193, as well as the fan blade, may be prevented, thereby enabling effective utilization of the suction surface of the fan blade and lowering of the noise level.

Figure 60:
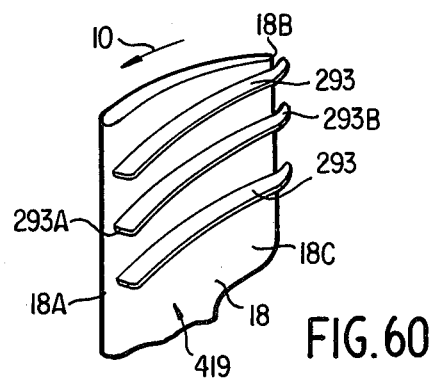

According to the nineteenth embodiment of the present invention as disclosed in FIG. 60, three vanes 293 are provided on the pressure surface 18C of the blade of the fan 419 with equal spacing therebetween, but are inclined somewhat in the radially outward direction from the center of rotation of the fan. As compared with the fan having the vanes formed normally to the surface of the fan blade, there may be achieved a further improvement in the blowing action of the fan blade, and a combined effect of this blowing action and the axial blowing action by means of the fan blade 18 may be further improved, thereby presenting advantages similar to the eighteenth embodiment of the invention as shown in FIG. 59.

Figure 61:
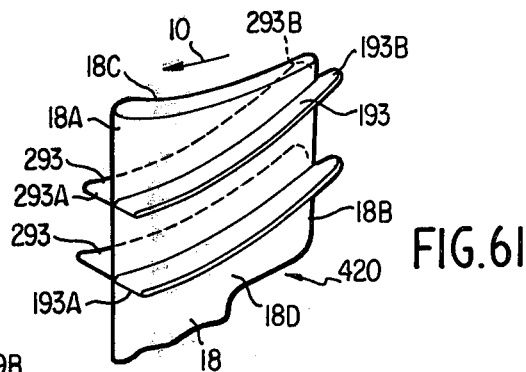

According to the twentieth embodiment of the invention as shown in FIG. 61, two vanes 193 are provided on the suction surface 18D and two vanes 293 are provided on the pressure surface 18C of the blade of the fan 420 with equal spacing therebetween the same being inclined somewhat radially outwardly from the center of rotation of the fan. As compared with the fan having the vanes formed on both surfaces of the fan blade in the direction normal to the aforenoted both surfaces of the blade, there may be achieved a further improved blowing action of the fan in the centrifugal direction, and a combined effect of this blowing action and an axial blowing action by means of the fan blade 18 may be further enhanced, thus presenting considerably improved advantages of the fan, as compared with those of the eighteenth and nineteenth embodiments shown in FIGS. 59 and 60.

In the above fifteenth to twentieth embodiments, all of the vanes are inclined, however, modifications, such as, for example, those shown in FIGS. 62-65 are also possible.

Figure 62:
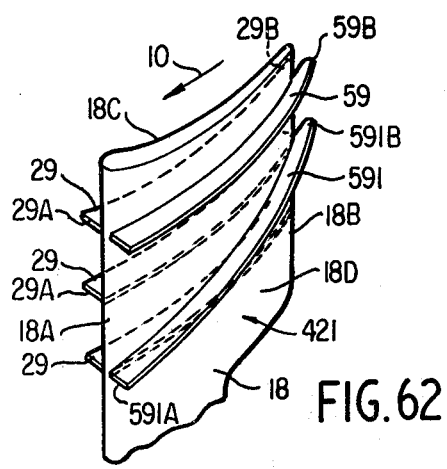

According to the twenty-first embodiment as shown in FIG. 62, the vanes 59 and 591 are positioned with unequal spacing therebetween, and are inclined radially outwardly on the suction surface 18D of the blade of the fan 421, while three vanes 29 are disposed perpendicular to the pressure surface 18C of the fan blade with equal spacing therebetween.

In this embodiment, the provision of the inclined vanes 59 and 591 with unequal spacings therebetween at the leading and trailing edges results in the advantages similar to those of the fifteenth embodiment, and, in addition, the provision of the perpendicular vanes 29 with equal spacings therebetween may enhance the blowing action of the fan in the centrifugal direction on the pressure surface of the fan blade, so that a combined effect of the above blowing action and the axial blowing action of the fan blade 18 further improves the efficiency of the fan, a reverse flow of the air streams through the clearance S defined between the fan blade 18 and the shroud if any, may be prevented, the efficiency and airflow of the fan may be improved, and the production of the vortex flows on, and separation of the air streams from, the respective surfaces of the vanes 59, 591, and 29, and fan blade 18, may be prevented, thereby enabling effective utilization of the respective surfaces 18D and 18C of the fan blade and the lowering of the noise level.

Furthermore, the three vanes 29 provided in the twenty-second embodiment may be inclined, as shown in FIG. 60, thus presenting further improved blowing effects and functions.

Figure 63:
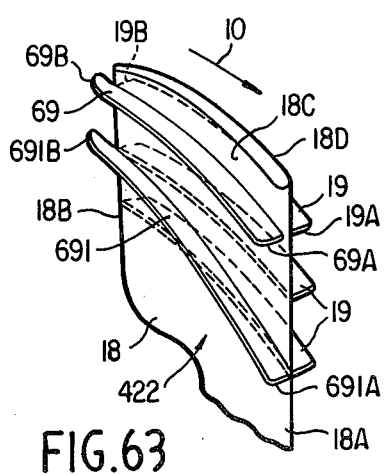

According to the twenty-second embodiment of the present invention as shown in FIG. 63, three perpendicularly projecting vanes 19 are provided on the suction surface 18D of the blade 18 of the fan 422 with equal spacings therebetween at the leading and trailing edges, while inclined vanes 69 and 691 are provided on the pressure surface 18C of the fan blade 18 with unequal spacings therebetween. This embodiment may present advantages similar to those of the embodiment of FIG. 62.

Figure 64:
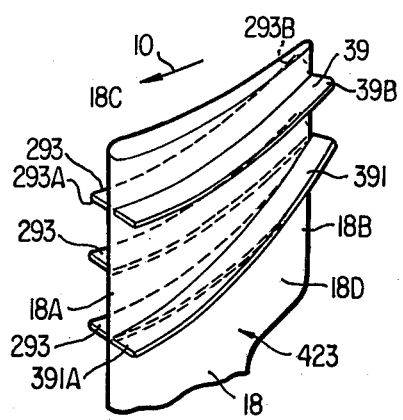

According to the twenty-third embodiment of the invention, as disclosed in FIG. 64, perpendicularly projecting vanes 39 and 391 are positioned on the suction surface 18D of the blade 18 of the fan 423 with unequal spacings therebetween, while three inclined vanes 293 are formed on the pressure surface 18C of the fan blade 18 with equal spacings therebetween. This embodiment thus presents combined effects of the tenth and nineteenth embodiments.

Figure 65:
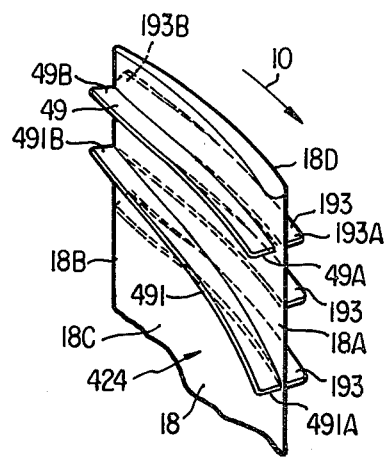

According to the twenty-fourth embodiment of the present invention, as seen in FIG. 65, three inclined vanes 193 are provided on the suction surface 18D of the fan blade 18 of the fan 424 with equal spacings therebetween, and perpendicularly projecting vanes 49 and 491 are provided on the pressure surface 18C of the fan blade with unequal spacings therebetween, so that the embodiment of FIG. 65 may present advantages similar to those of the embodiment of FIG. 64.

Figure 66A:
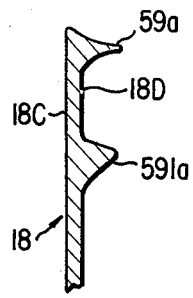
FIGS. 66(A)–66(F) are partial, transverse, cross-sectional views of additional modifications of the fan blades which may be used, for example, in the fifteenth embodiment of the present invention as illustrated in FIG. 45.
Figure 66B:
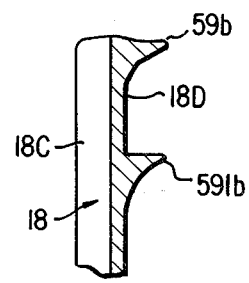
Figure 66C:
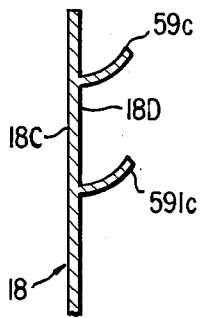
Figure 66D:
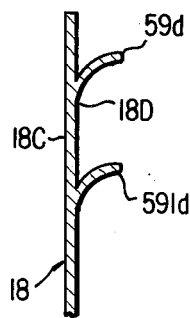
Figure 66E:
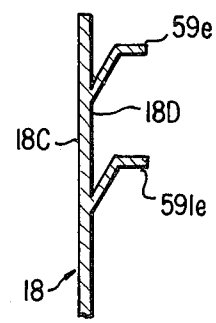
Figure 66F:
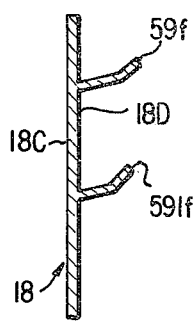

In the above fifteenth to the twenty-fourth embodiments, as long as the vanes, provided on the surface of the blade and projecting substantially in the width direction of the fan blade, are inclined in an angular range extending from the direction parallel to the fan blade surface to the perpendicular direction with respect to the surface of the fan blade, while also extending substantially radially thereof, then the shape of the vanes may be a combination of a line and a curve as seen in FIGS. 66(A) and (B), of a particular curved type as seen in FIGS. 66(C) and (D) or of a particular bent type as seen in FIGS. 66(E) and (F).

In the fifth aspect of the present invention as shown in the fifteenth to the twenty-fourth embodiments, since the fan blade must be of a large pitch angle in order to produce a great quantity of airflow, the auxiliary blades are provided on the surface of the blade and are inclined radially outwardly at a predetermined angle, and since the separation and turbulence of the air streams occurring at the trailing side on the surface of the blade is effectively eliminated by the radial flow having a velocity component pressed against the surface of the blade, a greater quantity of airflow may be produced and the blowing efficiency is raised. Furthermore, in the fifth aspect, the fan noise and reverse flow are more effectively reduced than in the first to third aspects. The compact fan of the fifth aspect may thus supply a large quantity of airflow to a large obstacle, such as, for example, an engine or other large machine, by means of the radial and axial flows.

As described above by reference to the five aspects, the present invention relates to improvements in axial flow fans. The present invention produces the radial flow by means of the auxiliary blade in addition to the prior art axial flow, so that the airflow increases, and the turbulence and separation of the air streams on the surfaces of the blades are eliminated. Accordingly, the blowing efficiency is raised and the fan noise and reverse flow is reduced.

In the prior art, a large fan having a large outer diameter is necessary in order to supply sufficient airflow to a large obstacle. However, in the axial flow fan of the present invention, since the airflow is increased by the radial airflow, and since the outlet airflow is radially enlarged by the radial airflow, the compact axial flow fan may supply a large quantity of airflow to the large obstacle, such as, for example, an engine or other large machines.

In the above embodiments, we explain the present invention by referring to the axial flow fan as applied to a cooling fan of an engine in a motor vehicle for convenience of explanation, however, the present invention should not be so limited.

In the above tenth to twenty-fourth embodiments, the shape of the tip of the blade should not necessarily be limited to an arcuate configuration, but the tip may include a small, radially outwardly projecting arcuate portion on the trailing edge side of the blade as shown in FIGS. 8-9, 17-18, and 26-27 so that the vane may be extended toward the same so as to obtain further advantages.

The fan according to the first to twenty-fourth embodiments of the present invention may be fabricated by securing the auxiliary blades or vanes to the blades of a prior art axial flow fan by bonding, welding, fastening, such as, for example, using screws and rivets, or the like, while the auxiliary blades or vanes may be provided integrally with the fan by means of molding plastics. In case a cooling fan for a motor vehicle is made of plastic, there may often result thermal distortion of the fan, however, such distortion may be obviated since the strength of the blade can be increased by securing the auxiliary blades thereto according to the present invention.

The aforenoted embodiments provide two or three auxiliary blades per fan. Alternatively, however, a single auxiliary blade, or more than three auxiliary blades may be used. Furthermore, at least one auxiliary blade may be provided on a suction and/or pressure surface of each of at least two of a plurality of blades.

In the fifth aspect of the present invention, the inclination of the auxiliary blade is gradually changed. Alternatively, however, the inclination may be the same over the entire length of the auxiliary blade.

Although the aforenoted embodiments refer to an axial flow fan of the suction type for use in an engine cooling system of a motor vehicle, it should be noted that the present invention is by no means limited to these embodiments. Thus, the present invention may be applied to axial flow fans of an air impelling type for use in buses or industrial transporting machines, ventilating fans for domestic use, as well as in plants, and fans for air conditioners.

Obviously, many modifications and variations of the present invention are possible in light of the above teachings. It is to be understood therefore that within the scope of the appended claims, the invention may be practiced otherwise than as specifically described herein.

What is claimed as new and desired to be secured by letters patent of the United States is:

1. An axial flow fan comprising:
   a hub member rotatably supported and driven by a drive source;
   a plurality of blades having a predetermined angle with respect to the rotational direction thereof and a predetermined width and height, said blades being radially provided on said hub member; and
   a plurality of auxiliary blades disposed upon and projecting from each of at least two of said blades, the leading edges of said auxiliary blades, as viewed in the direction of the rotational axis thereof, being spaced closer to the rotational center of said hub member than the trailing edges of said auxiliary blades, a distance between two adjacent auxiliary blades at said leading edges thereof in said radial direction of said blades being longer than that at said trailing edges thereof, wherein the surfaces of the auxiliary blades are radially inwardly offset with respect to lines joining the leading edges of said auxiliary blades and the trailing edges of said auxiliary blades,
   whereby an axial flow is produced by said blades and a strong radial flow is produced by said auxiliary blades.

2. An axial flow fan according to claim 1, wherein:
said auxiliary blades are provided on a suction surface of each of said plurality of blades.

3. An axial flow fan according to claim 1, wherein:
said auxiliary blades are provided on a pressure surface of each of said plurality of blades.

4. An axial flow fan according to claim 1, wherein:
said auxiliary blades are provided on both a suction surface and a pressure surface of each of said plurality of blades.

5. An axial flow fan according to claim 1, wherein:
said auxiliary blades are inclined radially outwardly at predetermined angles with respect to the surfaces of said blades,
thereby smoothly producing said radial flow by said inclined auxiliary blades.

6. An axial flow fan according to claim 1, wherein:
said auxiliary blades extend from a leading edge portion toward a trailing edge portion of each of said blades.

7. An axial flow fan according to claim 1, wherein:
said auxiliary blades are provided on a trailing edge portion of each of said blades.

8. An axial flow fan according to claim 1, wherein:
said auxiliary blades comprise two auxiliary blades, having a predetermined width, length, and thickness, perpendicularly disposed with respect to said blade along two curved lines having different positive inclinations, from the forward portion to the rear end portion of the trailing edge side of said blade, and curvature, said two curved lines being respectively provided on the suction and pressure surfaces of said blade;
the setting angle, inlet angle, and outlet angle of the radially outer one of said two auxiliary blades being smaller than that of the radially inner one thereof.

9. An axial flow fan according to claim 1, wherein:
said auxiliary blades comprise two auxiliary blades having a predetermined width, of about 8–20 mm, length, and thickness, perpendicularly disposed along two curved lines having different positive inclinations, from the leading edge portion to the trailing edge portion of said blade, and curvature, said two curved lines being provided on the suction surface of said blade;
the inlet angle of said auxiliary blade within the vicinity of the leading edge of said auxiliary blade, as viewed in the direction of the rotational axis of said blade, is in the range of 0°–15°;
the outlet angle of said auxiliary blade in the vicinity of the trailing edge of said auxiliary blade as viewed in the direction of the rotational axis of said blade is in the range of 15°–60°;
the setting angle, inlet angle, and outlet angle of the radially outer one of said two auxiliary blades is smaller than that of the radially inner one thereof; and
said width of said auxiliary blade is gradually increased from the leading edge toward the trailing edge thereof.

10. An axial flow fan according to claim 5, wherein:
said auxiliary blades comprise two auxiliary blades having a predetermined width, of about 8–20 mm, length, and thickness, disposed along two curved lines having different positive inclinations, from the leading edge portion to the trailing edge portion of said blade, curvature, and downward inflection, said two curved lines being provided on the suction surface of said blade;
the inlet angle of said auxiliary blade in the vicinity of the leading edge of said auxiliary blade, as viewed in the direction of the rotational axis of said blade, is in the range of 0°–15°;
the outlet angle of said auxiliary blade in the vicinity of the trailing edge of said auxiliary blade, as viewed in the direction of the rotational axis of said blade, is in the range of 15°–60°;

the setting angle, inlet angle, and outlet angle of the radially outer one of said two auxiliary blades is smaller than that of the radially inner one thereof;

said width of said auxiliary blade is gradually increased from the leading edge toward the trailing edge thereof;

the setting angle $\theta_1$ of said auxiliary blade is in the range of 5°–30°;

the inclined angle between the projecting axis of said auxiliary blade and an axis perpendicular to the suction surface of said blade gradually increases from said leading edge portion to said trailing edge portion;

the inclined angle $\gamma_1$ of said auxiliary blade at said leading edge portion is in the range of 0°–10°; and the inclined angle $\gamma_2$ of said auxiliary blade at said trailing edge portion is in the range of 15°–45°.

11. An axial flow fan according to claim 10, wherein:

the outer diameter of said fan comprising six blades is 360 $\phi$;

the setting angle $\theta_5$ of said outer auxiliary blade is 12°;

the setting angle $\theta_6$ of said inner auxiliary blade is 23°;

the outlet angle $\beta_5$ of said outer auxiliary blade is 25°;

the outlet angle $\beta_6$ of said inner auxiliary blade is 50°;

said distance between said outer and inner auxiliary blades at said leading edge portion is 48 mm; and said distance between said outer and inner auxiliary blades at said trailing edge portion is 30 mm.

12. An axial flow fan according to claim 5, wherein:

said auxiliary blades comprise two auxiliary blades having a predetermined width, of about 8–20 mm, length, and thickness, disposed along two curved lines having different positive inclinations from the leading edge portion toward the trailing edge portion of said blade, and curvature, said two curved lines being respectively provided on the suction and pressure surfaces of said blade;

the inlet angle of said auxiliary blade in the vicinity of the leading edge of said auxiliary blade as viewed in the direction of the rotational axis of said blade is in the range of 0°–15°;

the outlet angle of said auxiliary blade in the vicinity of the trailing edge of said auxiliary blade as viewed in the direction of the rotational axis of said blade is in the range of 15°–60°;

the setting angle, inlet angle, and outlet angle of the radially outer one of said two auxiliary blades is smaller than that of the radially inner one thereof;

the setting angle $\theta_1$ of said auxiliary blade is in the range of 15°–30°;

the inclined angle between a projecting axis of said auxiliary blade and an axis perpendicular to each of said suction and pressure surfaces of said blade gradually increases from said leading edge portion toward said trailing edge portion;

the inclined angle $\gamma_1$ of said auxiliary blade at said leading edge portion is in the range of 0°–10°; and the inclined angle $\gamma_2$ of said auxiliary blade at said trailing edge portion is in the range of 15°–45°.

13. An axial flow fan according to claim 5, wherein:

two auxiliary blades having a predetermined width, of about 8–20 mm, length, and thickness are disposed along two curved lines having different positive inclinations, from the leading edge portion to the trailing edge portion of said blade, and curvature, said two curved lines being provided on the suction surface of said blade;

the inlet angle of said auxiliary blade in the vicinity of the leading edge of said auxiliary blade as viewed in the direction of the rotational axis of said blade is in the range of 0°–15°;

the outlet angle of said auxiliary blade in the vicinity of the trailing edge of said auxiliary blade as viewed in the direction of the rotational axis of said blade is in the range of 15°–60°;

the setting angle, inlet angle, and outlet angle of the radially outer one of said two auxiliary blades is smaller than that of the radially inner one thereof;

the setting angle $\theta_1$ of said auxiliary blade is in the range of 5°–30°;

the inclined angle between the projecting axis of said auxiliary blade and an axis perpendicular to said suction surface of said blade gradually increases from said leading edge portion to said trailing edge portion;

the inclined angle $\gamma_1$ of said auxiliary blade at said leading edge portion is in the range of 0°–10°;

the inclined angle $\gamma_2$ of said auxiliary blade at said trailing edge portion is in the range of 15°–45°; and wherein further, three auxiliary blades having a predetermined width of about 8–20 mm, length, and thickness are disposed perpendicularly with respect to said blade, along three curved lines having the same positive inclination, from the leading edge portion of the trailing edge portion of said blade, curvature, and downward inflection, said three curved lines being provided on said pressure surface of said blade with a constant distance therebetween.

14. An axial flow fan according to claim 5, wherein:

two auxiliary blades having a predetermined width, of about 8–20 mm, length, and thickness are disposed along two curved lines having different positive inclinations, from the leading edge portion to the trailing edge portion of said blade, and curvature, said two curved lines being provided on the suction surface of said blade;

the inlet angle of said auxiliary blade in the vicinity of the leading edge of said auxiliary blade as viewed in the direction of the rotational axis of said blade is in the range of 0°–15°;

the outlet angle of said auxiliary blade in the vicinity of the trailing edge of said auxiliary blade as viewed in the direction of the rotational axis of said blade is in the range of 15°–60°;

the setting angle, inlet angle, and outlet angle of the radially outer one of said two auxiliary blades is smaller than that of the radially inner one thereof;

the setting angle $\theta_1$ of said auxiliary blade is in the range of 5°–30°;

the inclined angle between the projecting axis of said auxiliary blade and an axis perpendicular to said suction surface of said blade gradually increases from said leading edge portion to said trailing edge portion;

the inclined angle $\gamma_1$ of said auxiliary blade at said leading edge portion is in the range of 0°–10°;

the inclined angle $\gamma_2$ of said auxiliary blade at said trailing edge portion is in the range of 15°–45°; and wherein further, three auxiliary blades having a predetermined width, length, and thickness are provided along three curved lines having the same positive inclination, from the leading edge portion to the trailing edge portion of said blade, curvature, and downward inflection, said three curved lines being provided on said pressure surface of said blade with a constant distance therebetween; and said three auxiliary blades provided on said pressure surface of said blade are inclined radially outwardly at a predetermined angle.

15. An axial flow fan according to claim 5, wherein:

three auxiliary blades having a predetermined width, length, and thickness are disposed with a radially outward inclination of a predetermined angle along three curved lines having the same positive inclination, from the leading edge portion to the trailing edge portion of said blade, curvature, and downward inflection, said three curved lines being provided on said suction surface of said blade with a constant distance therebetween, and wherein further:

two auxiliary blades having a predetermined width, of about 8–20 mm, length, and thickness are perpendicularly disposed on said blade along two curved lines having different positive inclinations, from the leading edge portion to the trailing edge portion of said blade, curvatures, and downward inflections, said two curved lines being provided on said pressure surface of said blade with a constant distance therebetween, the distance between the two auxiliary blades at said leading edge portion on the pressure surface of said blade being longer than that at said trailing edge portion thereof.

16. An axial flow fan according to claim 1, wherein:

the width of said auxiliary blades gradually increases from the leading edge portion to the trailing edge portion.

17. An axial flow fan according to claim 5, wherein:

said inclined angle of said auxiliary blades with respect to said surface of said blades gradually increases from the leading edge portion to the trailing edge portion.

18. An axial flow fan according to claim 1, wherein:

the width of said auxiliary blades is disposed perpendicularly to the surface of said blade.

* * * * *